United States Patent
Kumar et al.

(10) Patent No.: US 10,069,781 B2
(45) Date of Patent: Sep. 4, 2018

(54) OBSERVATION PLATFORM USING STRUCTURED COMMUNICATIONS WITH EXTERNAL DEVICES AND SYSTEMS

(71) Applicant: Theatro Labs, Inc., Richardson, TX (US)

(72) Inventors: Ravi Shankar Kumar, Richardson, TX (US); Guy R. VanBuskirk, Spicewood, TX (US); Steven M. Lucy, Dallas, TX (US); Shiva Cheedella, Dallas, TX (US); Kiran Kumar, S B, Bangalore (IN); Ashok Donthe Manjunath, Chikkaballapur (IN)

(73) Assignee: Theatro Labs, Inc., Richardson, TX (US)

( * ) Notice: Subject to any disclaimer, the term of this patent is extended or adjusted under 35 U.S.C. 154(b) by 306 days.

(21) Appl. No.: 14/869,167

(22) Filed: Sep. 29, 2015

(65) Prior Publication Data

US 2017/0093952 A1 Mar. 30, 2017

(51) Int. Cl.
| | |
|---|---|
| *H04L 12/58* | (2006.01) |
| *H04L 29/08* | (2006.01) |
| *H04W 4/18* | (2009.01) |
| *H04W 4/20* | (2018.01) |
| *H04W 4/70* | (2018.01) |

(52) U.S. Cl.
CPC .............. *H04L 51/18* (2013.01); *H04L 67/22* (2013.01); *H04W 4/18* (2013.01); *H04W 4/20* (2013.01); *H04W 4/70* (2018.02)

(58) Field of Classification Search
CPC ......... H04L 67/18; H04L 51/18; H04L 67/22; G06Q 30/0269; G06Q 30/0635
See application file for complete search history.

(56) References Cited

U.S. PATENT DOCUMENTS

| | | |
|---|---|---|
| 5,712,899 A | 1/1998 | Pace |
| 6,301,573 B1 | 10/2001 | McIlwaine et al. |
| 6,377,927 B1 | 4/2002 | Loghmani et al. |

(Continued)

FOREIGN PATENT DOCUMENTS

WO    0210926 A1    2/2002

OTHER PUBLICATIONS

"Extended Supplementary Search Report App # 14160323.3", dated Jun. 18, 2014, 6 pages.

(Continued)

*Primary Examiner* — Lashonda Jacobs

(57) ABSTRACT

Methods and systems for using an observation platform with an external device are disclosed. A signal is received from a first communication device at a second communication device associated with a computer system. Context information is derived from the signal at the computer system from, a speech to text analysis of the audible source, a policy implemented in the computer system by a controlling enterprise, and inferences calculated by a combination of text analysis, and secondary information contained in the signal. An action is determined to take place at an external device or user device based on the context information, wherein the external device is one of a plurality of external devices and is networked to the second communication device or a plurality of devices. A second signal is sent to the external device to instruct the device to take the action.

35 Claims, 14 Drawing Sheets

(56) References Cited

U.S. PATENT DOCUMENTS

| | | | |
|---|---|---|---|
| 6,928,343 B2 | 8/2005 | Cato | |
| 6,937,988 B1 | 8/2005 | Hemkumar et al. | |
| 6,937,998 B1 | 8/2005 | McGlynn et al. | |
| 6,996,531 B2 | 2/2006 | Korall et al. | |
| 7,058,208 B2 | 6/2006 | Chang et al. | |
| 7,248,881 B2 | 7/2007 | Shostak | |
| 7,397,368 B2 | 7/2008 | Otto et al. | |
| 7,656,295 B2 | 2/2010 | Robson et al. | |
| 7,748,618 B2 | 7/2010 | Vawter | |
| 7,925,777 B2 | 4/2011 | Levett | |
| 8,055,296 B1 | 11/2011 | Persson et al. | |
| 8,060,412 B2 | 11/2011 | Rosenbaum et al. | |
| 8,140,340 B2 | 3/2012 | Bhogal et al. | |
| 8,179,872 B2 | 5/2012 | Bienfait et al. | |
| 8,180,377 B2 | 5/2012 | Yang et al. | |
| 8,183,996 B2 | 5/2012 | Toyokawa et al. | |
| 8,200,480 B2 | 6/2012 | Shectman et al. | |
| 8,271,188 B2 | 9/2012 | De Koning | |
| 8,352,260 B2 | 1/2013 | Sung et al. | |
| 8,369,505 B2 | 2/2013 | Vuong | |
| 8,473,289 B2 | 6/2013 | Jitkoff et al. | |
| 8,630,851 B1 | 1/2014 | Hertschuh et al. | |
| 8,699,694 B2 | 4/2014 | Chishti et al. | |
| 8,798,036 B2 | 8/2014 | Kūt et al. | |
| 8,948,730 B2 | 2/2015 | Vanbuskirk et al. | |
| 9,042,921 B2 | 5/2015 | Karmarkar | |
| 9,053,449 B2 | 6/2015 | Kumar et al. | |
| 9,271,118 B2 | 2/2016 | Vanbuskirk et al. | |
| 9,311,466 B2 | 4/2016 | Headley | |
| 9,349,128 B1 | 5/2016 | Kerr et al. | |
| 9,407,543 B2 | 8/2016 | Russell et al. | |
| 9,414,195 B2 | 8/2016 | Russell et al. | |
| 9,445,232 B2 | 9/2016 | Russell et al. | |
| 9,501,951 B2 | 11/2016 | Russell | |
| 9,514,656 B2 | 12/2016 | Russell | |
| 9,542,695 B2 | 1/2017 | Russell | |
| 9,602,625 B2 | 3/2017 | Russell et al. | |
| 9,686,732 B2 | 6/2017 | Russell et al. | |
| 9,691,047 B2 | 6/2017 | Russell et al. | |
| 9,928,529 B2 | 3/2018 | Russell et al. | |
| 9,971,983 B2 | 5/2018 | Russell et al. | |
| 9,971,984 B2 | 5/2018 | Russell et al. | |
| 2002/0136383 A1 | 9/2002 | Contreras | |
| 2002/0143548 A1 | 10/2002 | Korall et al. | |
| 2003/0065805 A1 | 4/2003 | Barnes | |
| 2003/0130893 A1 | 7/2003 | Farmer | |
| 2004/0203989 A1 | 10/2004 | Karaoguz | |
| 2005/0021838 A1 | 1/2005 | Levett | |
| 2005/0190772 A1 | 9/2005 | Tsai et al. | |
| 2005/0213518 A1 | 9/2005 | Ahya et al. | |
| 2005/0221264 A1 | 10/2005 | Hearn et al. | |
| 2006/0071775 A1 | 4/2006 | Otto et al. | |
| 2006/0095317 A1 | 5/2006 | Brown et al. | |
| 2006/0248011 A1 | 11/2006 | Hecht-Nielsen et al. | |
| 2007/0046458 A1 | 3/2007 | Toyokawa et al. | |
| 2007/0064913 A1 | 3/2007 | Shaffer et al. | |
| 2007/0129061 A1 | 6/2007 | Ringland et al. | |
| 2007/0207789 A1 | 9/2007 | Zellner et al. | |
| 2008/0041937 A1 | 2/2008 | Vawter | |
| 2008/0154612 A1 | 6/2008 | Evermann et al. | |
| 2008/0159271 A1 | 7/2008 | Kutt et al. | |
| 2008/0240384 A1 | 10/2008 | Suryanarayana et al. | |
| 2008/0242319 A1 | 10/2008 | Paschetto et al. | |
| 2008/0270249 A1 | 10/2008 | Rosenbaum et al. | |
| 2008/0279133 A1 | 11/2008 | Bienfait et al. | |
| 2009/0003309 A1 | 1/2009 | Bawcutt et al. | |
| 2009/0005972 A1 | 1/2009 | De Koning | |
| 2009/0176510 A1 | 7/2009 | Routtenberg | |
| 2009/0234655 A1 | 9/2009 | Kwon | |
| 2009/0249432 A1 | 10/2009 | O'Sullivan et al. | |
| 2009/0254667 A1 | 10/2009 | Li et al. | |
| 2010/0003659 A1 | 1/2010 | Edmonds | |
| 2010/0009698 A1 | 1/2010 | Yang et al. | |
| 2010/0054526 A1 | 3/2010 | Eckles | |
| 2010/0070268 A1 | 3/2010 | Sung et al. | |
| 2010/0088749 A1 | 4/2010 | Steeples | |
| 2010/0094707 A1 | 4/2010 | Freer | |
| 2010/0113062 A1 | 5/2010 | Lee et al. | |
| 2011/0022642 A1 | 1/2011 | Demilo et al. | |
| 2011/0072154 A1 | 3/2011 | Bogdanovic et al. | |
| 2011/0077989 A1 | 3/2011 | Akred et al. | |
| 2011/0093818 A1 | 4/2011 | Sathish | |
| 2011/0171935 A1 | 7/2011 | Kamal | |
| 2011/0179180 A1 | 7/2011 | Schleifer et al. | |
| 2011/0201356 A1 | 8/2011 | George et al. | |
| 2011/0202466 A1 | 8/2011 | Carter | |
| 2011/0205053 A1 | 8/2011 | Chen et al. | |
| 2011/0255680 A1 | 10/2011 | Vuong | |
| 2012/0034590 A1 | 2/2012 | Hallsten et al. | |
| 2012/0089617 A1 | 4/2012 | Frey | |
| 2012/0123890 A1 | 5/2012 | Nathan | |
| 2012/0151380 A1 | 6/2012 | Bishop | |
| 2012/0226757 A1 | 9/2012 | McFarland et al. | |
| 2012/0310980 A1 | 12/2012 | Hepper | |
| 2013/0040600 A1 | 2/2013 | Reitnour et al. | |
| 2013/0060568 A1 | 3/2013 | Russell et al. | |
| 2013/0073388 A1 | 3/2013 | Heath | |
| 2013/0117824 A1 | 5/2013 | Naslund et al. | |
| 2013/0130207 A1 | 5/2013 | Russell et al. | |
| 2013/0196706 A1 | 8/2013 | Patel et al. | |
| 2013/0196906 A1 | 8/2013 | Eliasof | |
| 2013/0204972 A1 | 8/2013 | Russell et al. | |
| 2013/0204998 A1 | 8/2013 | Russell et al. | |
| 2013/0317944 A1* | 11/2013 | Huang | G01S 5/0252 705/26.61 |
| 2014/0052676 A1 | 2/2014 | Wagner et al. | |
| 2014/0148210 A1 | 5/2014 | Kundu et al. | |
| 2014/0316779 A1 | 10/2014 | Russell et al. | |
| 2014/0316898 A1 | 10/2014 | Russell et al. | |
| 2015/0065149 A1 | 3/2015 | Russell et al. | |
| 2015/0100433 A1* | 4/2015 | Choy | G06Q 30/0269 705/14.69 |
| 2015/0105061 A1 | 4/2015 | Russell et al. | |
| 2015/0106167 A1 | 4/2015 | Russell et al. | |
| 2015/0113098 A1 | 4/2015 | Vanbuskirk et al. | |
| 2015/0213382 A1 | 7/2015 | Russell et al. | |
| 2015/0269869 A1 | 9/2015 | Russell et al. | |
| 2016/0012471 A1 | 1/2016 | Fisher et al. | |
| 2016/0171432 A1* | 6/2016 | Pugh | G06Q 10/087 705/14.23 |
| 2016/0225045 A1* | 8/2016 | Cumberland | G06Q 30/0605 |
| 2016/0321595 A1 | 11/2016 | Russell et al. | |
| 2016/0321596 A1 | 11/2016 | Russell et al. | |
| 2016/0321611 A1 | 11/2016 | Russell et al. | |
| 2016/0323181 A1 | 11/2016 | Russell et al. | |
| 2016/0364790 A1* | 12/2016 | Lanpher | G06Q 30/0637 |
| 2017/0011449 A1* | 1/2017 | Mueller | G06Q 30/0635 |
| 2017/0024804 A1* | 1/2017 | Tepfenhart, Jr. | G06Q 30/0635 |
| 2017/0039512 A1* | 2/2017 | Jones | G06Q 10/087 |
| 2017/0091837 A1 | 3/2017 | Russell et al. | |
| 2017/0093952 A1 | 3/2017 | Kumar et al. | |
| 2017/0187826 A1 | 6/2017 | Russell et al. | |
| 2017/0213178 A1 | 7/2017 | Todd et al. | |
| 2018/0189844 | 7/2018 | Russell et al. | |

OTHER PUBLICATIONS

"International Search Report PCT/2012/025984", dated Dec. 22, 2012, 9 pages.
Arbanowski, "I-centric Communications: Personalization, Ambient Awareness and Adaptability for Future Mobile Services", IEEE Communications Magazine, Sep. 2004, 7 pages.
Rao, "Geographic Routing without Location Information", 9th Annual International Conference on Mobile Computing and Networking, Sep. 2003, 13 pages.
Extended European Search Report, Application No. 12748969.8, dated Dec. 15, 2016, 7 pages.
"What is Cloud Networking or Cloud Based Networking?", SDxCentral, www.sdxcentral.com/cloud/definitions/all-about-cloud-networking/, 2017, 2 pgs.

* cited by examiner

Process
400

A SIGNAL FROM A FIRST COMMUNICATION DEVICE IS RECEIVED AT A SECOND COMMUNICATION DEVICE, WHEREIN A FIRST CHARACTERISTIC OF THE SIGNAL CORRESPONDS TO A VOICE OF A FIRST USER AND A SECOND CHARACTERISTIC OF THE SIGNAL CORRESPONDS TO INFORMATION INDICATIVE OF A GEOGRAPHIC POSITION OF THE FIRST COMMUNICATION DEVICE
402

THE FIRST USER ASSOCIATED WITH THE FIRST COMMUNICATION DEVICE IS RECOGNIZED
404

TEXT RELATED TO THE VOICE OF THE FIRST USER IS RECOGNIZED
406

CONTEXT INFORMATION FROM THE TEXT IS DERIVED AT A COMPUTER SYSTEM ASSOCIATED WITH THE SECOND COMMUNICATION DEVICE, WHEREIN THE CONTEXT INFORMATION CORRESPONDS TO A COMMAND RELATED TO THE TEXT
408

THE TEXT IS STORED IN A STORAGE MEDIUM FOR DEVELOPING KEY PERFORMANCE METRICS
410

THE SIGNAL IS RELAYED TO A DESTINATION DERIVED FROM THE CONTEXT INFORMATION
412

Fig. 4

Process
700

A SIGNAL IN A FIRST OBSERVATION PLATFORM IS RECEIVED FROM A FIRST COMMUNICATION DEVICE AT A SECOND COMMUNICATION DEVICE ASSOCIATED WITH A COMPUTER SYSTEM WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE, AND WHEREIN THE SECOND OBSERVATION PLATFORM IS ASSOCIATED WITH A RADIO RANGE
702

A FIRST USER ASSOCIATED WITH THE FIRST COMMUNICATION DEVICE IS RECOGNIZED AT THE COMPUTER SYSTEM
704

CONTEXT INFORMATION FOR THE SIGNAL IS DERIVED THE COMPUTER SYSTEM ASSOCIATED WITH THE SECOND COMMUNICATION DEVICE
706

THE SIGNAL IS RELAYED FROM THE COMPUTER SYSTEM TO A SECOND COMPUTER SYSTEM ASSOCIATED WITH A SECOND OBSERVATION PLATFORM
708

THE SIGNAL IS RELAYED TO A DESTINATION IN THE SECOND OBSERVATION PLATFORM VIA THE SECOND COMPUTER SYSTEM DERIVED FROM THE CONTEXT INFORMATION
710

Fig. 7

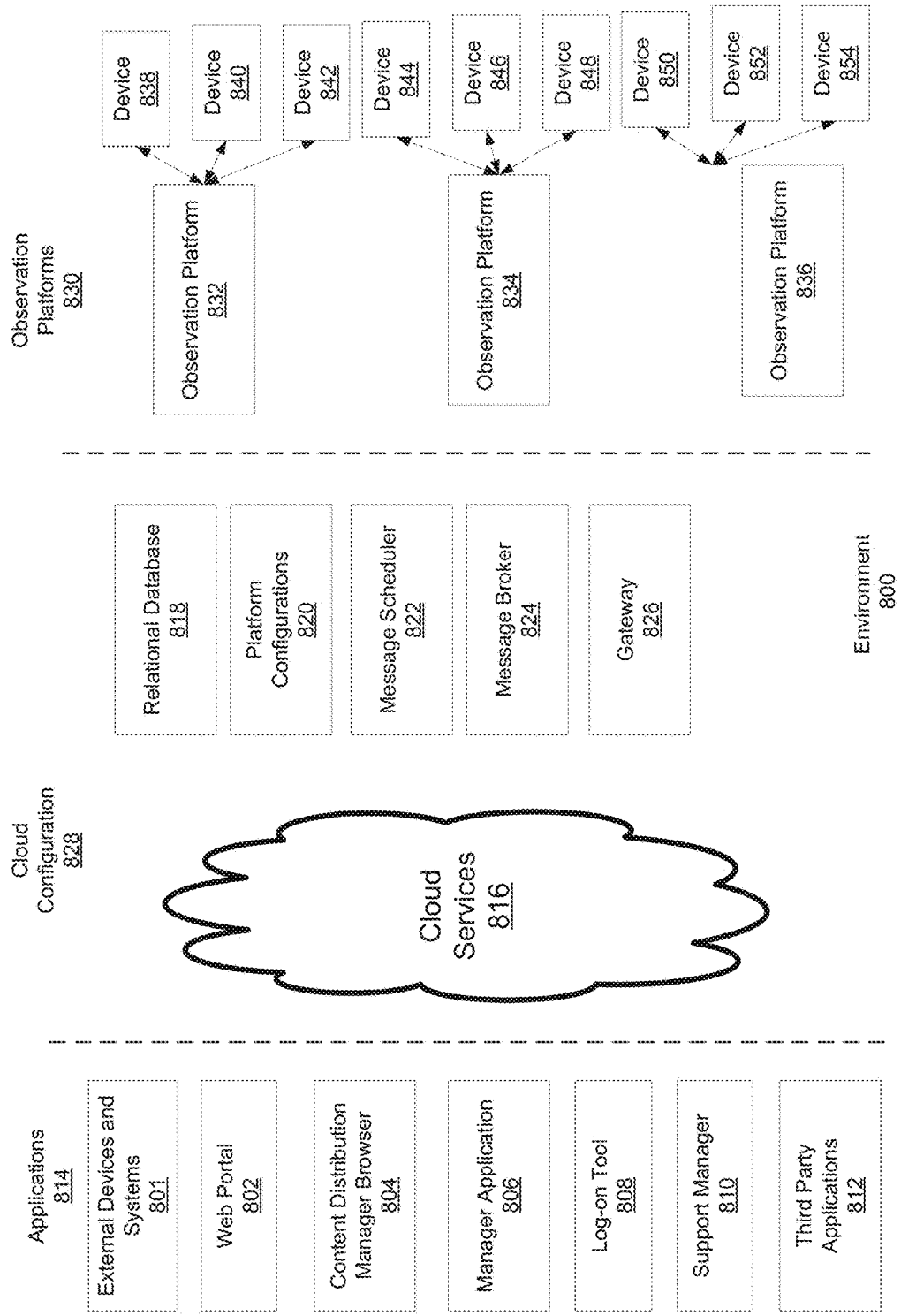

Process
1100

A SIGNAL IS RECEIVED FROM A FIRST COMMUNICATION DEVICE AT A SECOND COMMUNICATION DEVICE ASSOCIATED WITH A COMPUTER SYSTEM WHEREIN A FIRST CHARACTERISTIC OF THE SIGNAL CORRESPONDS TO AN AUDIBLE SOURCE AND A SECOND CHARACTERISTIC OF THE SIGNAL CORRESPONDS TO INFORMATION INDICATIVE OF A GEOGRAPHIC POSITION OF THE FIRST COMMUNICATION DEVICE.
1102

CONTEXT INFORMATION IS DERIVED FROM THE SIGNAL AT THE COMPUTER SYSTEM FROM, AT LEAST IN PART, A SPEECH TO TEXT ANALYSIS OF THE AUDIBLE SOURCE, A POLICY IMPLEMENTED IN THE COMPUTER SYSTEM BY A CONTROLLING ENTERPRISE, AND INFERENCES CALCULATED BY A COMBINATION OF TEXT ANALYSIS, AND SECONDARY INFORMATION CONTAINED IN THE SIGNAL.
1104

AN ACTION IS DETERMINED TO TAKE PLACE AT AN EXTERNAL DEVICE BASED ON THE CONTEXT INFORMATION, WHEREIN THE EXTERNAL DEVICE IS ONE OF A PLURALITY OF EXTERNAL DEVICES AND IS NETWORKED TO THE SECOND COMMUNICATION DEVICE.
1106

A SECOND SIGNAL IS SENT TO THE EXTERNAL DEVICE TO INSTRUCT THE DEVICE TO TAKE THE ACTION.
1108

Fig. 11

OBSERVATION PLATFORM USING STRUCTURED COMMUNICATIONS WITH EXTERNAL DEVICES AND SYSTEMS

BACKGROUND

Modern communication devices provide for many communication and business analytics opportunities in retail, hospitality, industrial and other settings. Many modern communication devices are diverse and also have wireless connectivity options. The wireless connectivity options may or may not follow standard protocols. Additionally, many different types of devices, systems, and/or objects may be networked including devices with electronics, software, sensors, and connectivity to enable the devices to collect and gather data to be exchanged over the network.

BRIEF DESCRIPTION OF THE DRAWINGS

FIG. 4 illustrates a flowchart of an example method for disciplining communications in accordance with embodiments of the present technology.

FIG. 7 illustrates a flowchart of an example method for structuring communication in a plurality of observation platforms in accordance with embodiments of the present technology.

FIG. 8 illustrates a block diagram of an example environment for connecting external devices and application via an application programming interface (API) into a plurality of observation platforms in accordance with embodiments of the present technology.

FIG. 11 illustrates a flowchart of an example method for observation platforms using structured communications with external devices and systems in accordance with embodiments of the present technology.

Figure 1A:
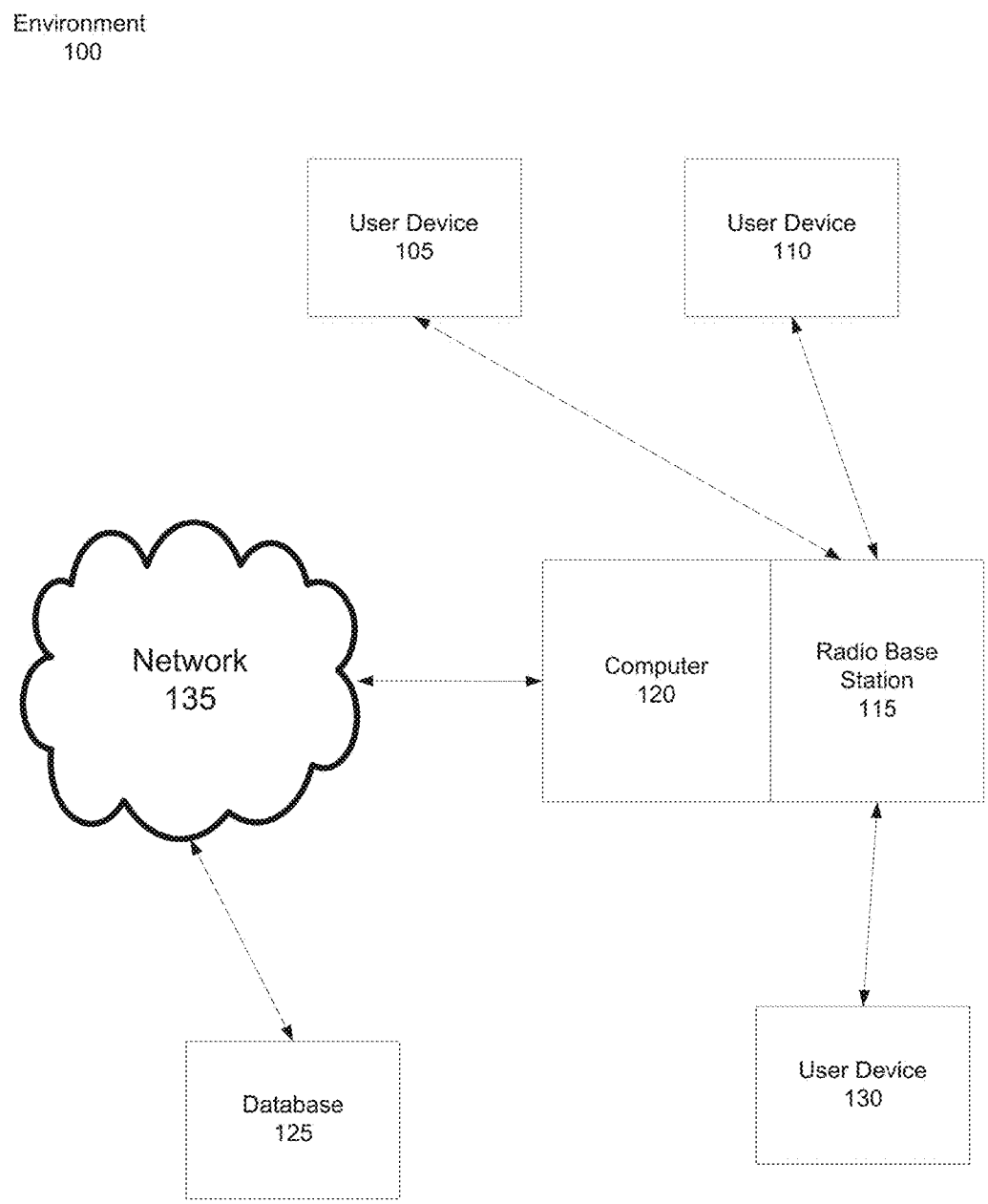
FIG. 1A illustrates a block diagram of an example environment for an observation platform for structuring a communication in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "recognizing," "deriving," "storing," "relaying," "executing," "generating," "determining," "tracking," "recording," "identifying," "making," "delivering," "scheduling," "specifying," or the like, refer to the actions and processes of a computer system, or similar electronic computing device. The computer system or similar electronic computing device, such as a telephone, smart phone, tablet computer, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Observation Platform Using Structured Communications with External Devices and Systems Embodiments of the present technology are for an observation platform using structured communications with external devices and systems. An observation platform may involve a number of users or people and provides structured and disciplined communications for the users and devices as well as captures data regarding the communications such as user context and performance metrics. The present technology may be employed in various environments such as retail settings, public-stage floors, outdoor venues, concerts, police scenarios, disaster areas, schools, sporting events, hospitality operations, hospitals, clinics, security operations, military operations, a prison organization, customer service centers, call centers, manufacturing organization, a factory, and other environments where humans work together and where communications occur between users.

An observation platform may be associated with external devices including a growing list of electronic devices that communicate with each other or with one or more systems providing status, alerts and other useful command/control information. These external devices are able to operate in an observation platform and communicate using formatted data strings and standard internet protocols for communication across the Internet. These external devices may be referred to as the Internet of Things (IoT).

The external devices may collect and gather data via sensors such as cameras, motion sensors, heat sensors, door counters, proximity sensors, beacons, temperature sensors, etc. The collected data may be exchanged via a network such as the network associated with the observation platform or via separate connections or networks. Moreover, the observation platform may be able to make inferences from communications and locations within the observation platform as well as make inferences from the data gathered by the external devices. The inferences may then be combined with policy and used to structure the communications and/or structure the control the external devices or take other actions within the observation platform.

In one embodiment, the structured communications of the observation platform allows users to directly and immediately interact with external devices through the mechanisms of the observation platform such as: interpretation of spoken words (e.g., speech-to-text), geographic location, and/or optional identification of end users and their respective roles and responsibilities.

An observation platform is used to connect enterprise users with each other and connect with external computer systems associated with the observation platform which will determine the most appropriate action given the context of each user by action, location, history, recognition of spoken words and optional personal identification.

The users of the observation platform carry or wear devices capable of capturing the person's voice, surrounding information such as sounds and sub-audible sounds, electronic signals or optical signals. Sub-audible sounds may or may not be made by a human user but are sounds that are out of the range of normal human hearing. Electronic signals may be any radio device or beacon which emits a radio signal that is received by the user device regardless whether the signal is demodulated or understood by the user device. The device develops a second signal from the surrounding information which is used by the observation platform to determine the location and context of the associated user. The device may be a commercially available device or, may be a specific purpose device built for the present technology using only one button that is pressed to capture the user's voice and other sounds.

Using structuring communications in an observation platform, as referred to herein, may refer to the following actions regarding communications between two or more users: disciplining, structuring, controlling, participating, discouraging, encouraging, influencing, nudging, making an example of, permitting, managing, managing to be in compliance with policies, measuring what goes on as a communication occurs, characterizing, enabling, observing, recording, correcting, directing, etc.

The structuring or disciplining process described herein involves using a communications and computer system as a platform to first, build a context and context history of each user based on actions and behaviors within the observation platform, and second, use enterprise policy and inference to make determinations about where to collect information or route information or messages. For example, the observation platform may listen to commands from users, interpret those commands, establish two-party and multi-party communications links, pass on messages, and store messages and commands. Commands may indicate the need for specific assistance at specific locations and policy may determine how many and what types (roles) of people hear the request. A response may be voluntary or mandatory, based on enterprise policy, and is similarly processed by the observation platform using context, policy and inference. Data is collected about each step of the process thereby permitting an owner or manager of a group of people to observe and analyze the effectiveness the group's interactions and of an individual's movements. The interpretation of commands may also be relayed or forwarded to the external devices as instructions to that device or plurality of devices.

The communications and behaviors of users within the observation platform may be monitored to derive context information from the primary statistics gathered by the system. The primary statistics used to determine context by the system are selected from the group of primary statistics consisting of: engagement time, available times, location maps, talk time, listen time, number of listeners, geographic location of device, locations traversed including speed and direction, length of said communication, under what circumstances, who initiated communications to which groups and individuals, presence information, type of communication, tone, emotion, lengths of speeches, lengths of speech segments, what policies are used for the communications, when and where two or more individuals dwell in close proximity to each other or to specific locations, speed of movement and pausing of listening individuals during/after talking or listening, and frequency that listeners delay hearing a message or drop out from what a speaker is saying, and/or promptness of responses to what was heard, button presses and button press durations as initiated by the user.

The communications may be monitored by a computer system associated with a radio base station or a wireless network that acts as a central hub for the user communications. The computer system may convert audible, voice or speech communications to a text or machine-compatible format using standard and well-known techniques. Decoding the spoken words may determine commands, identify keywords, and count keywords spoken or listened to. The decoded text may be used to derive additional context information from the communication. The computer system may also store some or all of the communication including the time and geographic location of the device at the time of the communication, the audible portion of the communication, the current context of the user, the decisions made by inference and policy, and the text format of the communication.

The computer system may also be in communication with the external devices and have the ability to issue instructions to the external devices. The structured communications may extend beyond a single venue to multiple venues or storage locations without regard to geographic location. Customers or users may refer to customers who are purchasing items or services in an environment, past customers, potential customers, perspective customers, shoppers, browsers, or others who enter the environment and do not represent the environment in an official capacity such as an employee does.

In one embodiment, the computer system uses the derived context information to determine a destination of the communication and forwards or relays the communication to the destination. For example, a first user may attempt to contact a second user via communication devices. The first user sends the communication to the computer system associated with the radio base station. The computer system recognizes the first user and is able to derive context information regarding the communication and determine that the communication's destination is a third user. The computer system then relays the communication, via the radio base station, to a communication device associated with the third user. The computer system may also convert the communication to text and derive contextual or performance metrics regarding the first or third user. For example, the first user may be an associate in a retail setting and the third user is a customer. The first user may be responding to a query made by the third user. The performance metric may be the length of time it took for the first user to respond to the query, or may be whether or not the query was satisfied, or may be the geographic location of the first user, or may be a different metric entirely. The computer system may derive and store more than one performance metric. The computer system may also access more than one communication regarding a user to determine some metrics.

In one embodiment, the computer system is able to determine geographic locations of users based on information received from communication devices associated with the users. The geographic location data may be stored as data associated with a user's communications device at a particular time, or as a performance metric, or may be combined with other information to generate a performance metric. The geographic information may also be used by managers to manage or train associates or to optimize customer service. Geographic information and user motion become elements of the user context and are used with policy and inference to determine the source or destination of information processed by the observation platform.

A user, as referred to herein, may be a person or people such as, associates, employees, managers, trainees, trainers, doctors, clinicians, patients, customers, emergency responders, personnel, etc. In one embodiment, the user interfaces with a device for communications with other users. Such a device may be a handheld device, a headset, a smartphone, an earpiece, a radio, a computer system, or other device capable of providing communications with the radio base station or via the API described herein. Such users may be external to the operating entity and desire access via the internet or an attached data network.

A performance metric may also be a metric, a key performance metric or a business metric. A metric or performance metric as referred to herein may be any type of data associated with or derived from a communication between users, including the location of the communications device, or the words spoken and the contextual state at the time of a particular communication event. In one embodiment, the computer system is able to generate a visual representation of metrics. For example, the visual representation may be a map of the geographic location of the users in an environment or may be a visual indication of the availability status of a user. In another example, the visual representation may be textual information such as the number of communications sent by a user or the length of time it took for a user to respond to a communication. The performance metrics may be sent in an audio message or displayed to a manager or other user for use in making decisions. The performance metrics may be used by the manager to optimize customer service in a retail setting by taking actions such as reprimanding or rewarding an associate, combining groups or teams of associates with differing and necessary behaviors as recorded by the observation platform, or being informed that no associates are located near a group of customers or in a specific location zone. Performance metrics may also generate real-time alerts and alarms or notifications that action or coordination is needed. These alerts and alarms are also routed to the most appropriate users based on context, policy and inference.

The present technology provides for many examples of how structuring communications may be used in various environments for a variety of purposes. The following discussion will demonstrate various hardware, software, and firmware components that are used with and in computer systems and other user devices for structuring communications using various embodiments of the present technology. Furthermore, the systems, platforms, and methods may include some, all, or none of the hardware, software, and firmware components discussed below.

Observation Platform Using Structured Communications with External Devices and Systems With reference now to FIG. 1A, a block diagram of an environment 100 for structuring communications in an observation platform. Environment 100 includes user devices 105, 110 and 130, radio base station 115, computer 120, database 125 and network 135. Environment 100 comprises components that may or may not be used with different embodiments of the present technology and should not be construed to limit the present technology. Some or all of the components of environment 100 may be described as an observation platform for structuring a communication.

The present technology makes use of communication devices. Radio base station 115 and user devices 105, 110 and 130 may also be described as communication devices. User devices 105, 110 and 130 may be user devices that are mobile and employed by a user to communicate with other users via other devices. Communications between the devices may be described as signals. The user devices 105, 110 and 130 may be a smartphone, a personal digital assistant, a fob, a handheld device, a headset device or other small electronic device. In one embodiment, user devices 105, 110 and 130 employ speakers and microphones with control buttons for audible communications. The control buttons may be pressed as signal buttons, push to talk buttons, volume control buttons, and power on/off buttons or other standard buttons and may be options on a touch screen. User devices 105, 110 and 130 may be a wearable device, a handheld device, may be worn around the neck, and may be a headset worn on the head or behind the ear or otherwise interface with the human body. User devices 105, 110 and 130 may or may not comprise a screen or display such as a liquid crystal display (LCD). In one embodiment, user devices 105, 110 and 130 do not comprise a display such that a user is not inundated with too many options or too much information from the device. A user device without a display may simplify communications and thus allow heads-up awareness and presence in the environment. Another user, such as a customer, may be more likely to employ the device for its intended purpose if the human interface is simplified. Alternately, someone external to the enterprise may connect through the external device API using a personal device such as a smartphone or tablet.

User devices 105, 110 and 130 and other devices in environment 100 may be dispensed to a user upon entering environment 100 or may be brought by the user into environment 100. For example, in a retail setting associates may be issued devices by the employer or owner of the retailer setting. Customers in the retail setting may also be issued devices as they enter the retail setting. Customers may choose whether or not to accept the device or whether or not to use the device after accepting it. The associate devices and the customer devices may or may not be the same type or model of devices. Alternatively, the customer may bring a device into the retail setting such as a smartphone. The customer may download an app to the smart phone that will allow the customer to use the device for communications in the store with associates or others in accordance with present technology. The customer may remain anonymous or may elect to identify themselves. In one embodiment, recognition of the customer's identity is not required for additional services or offers.

User devices 105, 110 and 130 may be low power devices or beacon devices. Beacons are typically stationary positioning systems, whether indoor or outdoor, that are used to determine a smartphone's approximate location or context. Beacons can communicate via protocols such as ZigBee or Wi-Fi, but most offerings use Bluetooth Low Energy (also known as Bluetooth Smart or BLE) to communicate, owing to the technology's ubiquity in smartphones and its improved battery life compared to earlier versions of Bluetooth.

Radio base station 115 may be a communication device that is capable of communicating with user devices 105, 110 and 130. Radio base station may simply be a component of computer 120 or may be a standalone device that is coupled with, connect to, or otherwise associated with computer 120. Radio base station 115 and computer 120 may be physically adjacent to one another or may be separated by a distance (e.g., cloud services). Computer 120 is able to instantaneously receive communications from radio base station 115 and to send communications to radio base station 115 for radio base station 115 to transmit the communication to its destination. Computer 120 is a computer system with a process and memory and is capable of executing commands, software and firmware. Computer 120 may be a desktop computer, a server computer, a cloud-based computer or other standard computing system or may be custom built for the present technology.

Radio base station 115 and user devices 105, 110 and 130 employ standard techniques for communicating wirelessly. The communications may be performed using radio techniques such as near field communications, short wave radio, infrared, Bluetooth, Low-energy Bluetooth (BLE), cellular radio, or Wi-Fi. User devices 105, 110 and 130 may be able to communicate with each other directly or through radio base station 115. User devices 105, 110 and 130 communicate with each other via the computer system 120. In one embodiment, all communications in environment 100 are relayed through radio base station 115 which acts as a central hub that applies context, policy and inference for routing information. For example, user device 105 may communicate with user device 110 by user device 105 sending a communication to radio base station 115, computer 120 derives that user device 110 is the destination for the communication and relays the communication to user device 110. This may occur automatically and quickly enough such that the users will not experience any undue lag in communications. In one embodiment, user devices 105, 110 and 130 may communicate directly with computer 120. For example, a user may issue a command to computer 120 via user device 105 or computer 120 may send information to user device 105. Information send from computer 120 to user device 105 may be an audible voice signal or may be textual, contextual, geographical or graphical data to be displayed at user device 105 if it is properly equipped to do so.

In one embodiment, user devices 105, 110 and 130 may communicate with one another directly, and their signals may be monitored and processed by computer system 120 via a monitoring system associated with the radio base station 115. Instructions or commands may still be directed towards the computer system 120.

In one embodiment, computer 120 is able to recognize a user sending a communication. The user may be recognized based on the device used to send the communication to computer 120 and radio base station 115. For example, user device 105 may have a unique signature associated with its transmissions such that computer 120 can identify and differentiate the device from another user. Such recognition of a user may then be employed by computer 120 for future communications with other devices. In one embodiment, the signal or communications between devices are encrypted. The signal may be encoded such that it is unique to a specific device. The encryption or encoding may be employed by computer 120 to recognize the user of the device. In one embodiment, the user may identify himself to the computer system 120 and the computer system 120 makes the association between user identification and user device 105's internal electronic identification.

Computer 120 may determine that the destination of a communication is a single device or a plurality of devices. Thus computer 120 may relay a communication from user device 105 only to user device 110 or may relay it to both user device 110 and user device 130. Computer 120 may determine that another user device is the destination of a communication originated by user device 105 but may also directly respond to the communication by executing a command or sending a communication back to user device 105. In one embodiment, a communication from user device 105 has more than one characteristic or aspect. For example, the communication may have a first characteristic that corresponds to an audible source such the words spoken by a user employing user device 105. The communication may also contain contextual information such as engaged, available, listening to information, returning to coverage zones, or other behavioral/contextual information. The communication may also have a third characteristic that comprises geographical position information of user device 105 or may have information indicative of a geographic position of user device 105. Computer 120 is able to determine a geographic position and direction of motion of a device from the information indicative of a geographic position of device. The motion may also be described as path of travel. A characteristic of the communication may be a portion of the communication, data associated with the communication, attributes of the communication, or metadata regarding the communication.

In one embodiment, computer 120 comprises a storage medium for storing some or all of a communication. Computer 120 may store all communications between devices in environment 100. Computer 120 may store communications for a pre-determined amount of time. Different characteristics of the communication may be stored including portions of the communication itself. Additionally, the computer may request and store all audible information regardless if the user presses a push to talk button or otherwise signals the need to begin a communication. For example, the communication may comprise an audible portion, a text portion, information indicative of a geographical position, and a geographical data portion. The audible portion may also be converted to text. Computer 120 may store all or some of the different portions including the portion converted to text. Computer 120 may store geographic position information regarding a device over a period of time such that a path of travel of the user may be inferred. Thus the position and context of a user may be mapped, tracked or predicted through a physical environment or area.

In one embodiment, computer 120 receives a communication from a device with a portion of the communication that corresponds to a voice of the user of the device. Computer 120 is able to convert the audible portion to information used by computer 120 to derive context information from the communication to determine performance metrics regarding the communication or the user of the device. The resulting information may also be interpreted as a command for computer 120 to execute. The resulting information may also be employed to determine a destination for the communication.

In one embodiment, each speaker is identified with a unique identifier with each voice file so that a speech-to-text engine can train on the speaker's voice and more accurately choose words from the dictionaries and individual user grammars. Individually customized dictionaries, confidence thresholds and grammars may be used for the sequential context of the spoken words. For example, saying, "urgent Bob" is interpreted by looking up the first word in a command dictionary and the second word in a names or places dictionary. In one embodiment, a frequency table is built for each user defining how frequently they call a name or place to improve the probability of selecting the correct word. In one embodiment, if a command, name, or place is not understood, the system may default to the most likely destination group. The user can easily opt out of the default destination and start again. Alternatively, if the command, name or place is not recognized, the computer system 120 may be programmed to default to a simple reply such as "command not recognized", "external device not responding" or "person not found."

In one embodiment, computer 120 executes a command received from user device 105. The command may be directly received from user device 105 or may be received in an audible voice signal which is converted to text and then interpreted to be a command for computer 120. The command may be to initiate a virtual voice connection between user device 105 and user device 110. The command may be to initiate a connection to an external device to control or query for information. The command may be for computer 120 to store information into or extract information out of database 125.

In one embodiment, computer 120 is able to access database 125 over network 135. Network 135 may be a local area network, a wireless network, the Internet or another computer network. In one embodiment, database 125 is a component part of computer 120 and network 135 is not required for computer 120 to access database 125. Database 125 may comprise an inventory of product or any other type of information. For example, in a retail setting a customer may use a device to communicate with an associate regarding whether the retail setting has a particular product in stock. The associate may use key terms to query computer 120 regarding whether the product is in stock. Computer 120 may convert the associate's voice to text and recognize the command regarding whether the product is in stock. Computer 120 then queries database 125 and sends a response back to the associate and/or customer. The response may be sent back using an audible signal or a signal to be displayed on a screen at the user device. Similar examples may be constructed around product location databases, workforce scheduling systems, on-floor zone assignments, time clock systems or other information systems used for operations and reporting. Alternatively, computer 120 may recognize a command based on the converted text without a user saying key terms. Users may or may not explicitly identify themselves to the system.

Database 125 may be a local inventory or a larger inventory. In one embodiment, database 125 is not an inventory but comprises different data. For example, a user may employ the device to communicate with and command computer 120 to perform a key word search of the Internet using a search engine such as a website search engine.

Figure 1B:
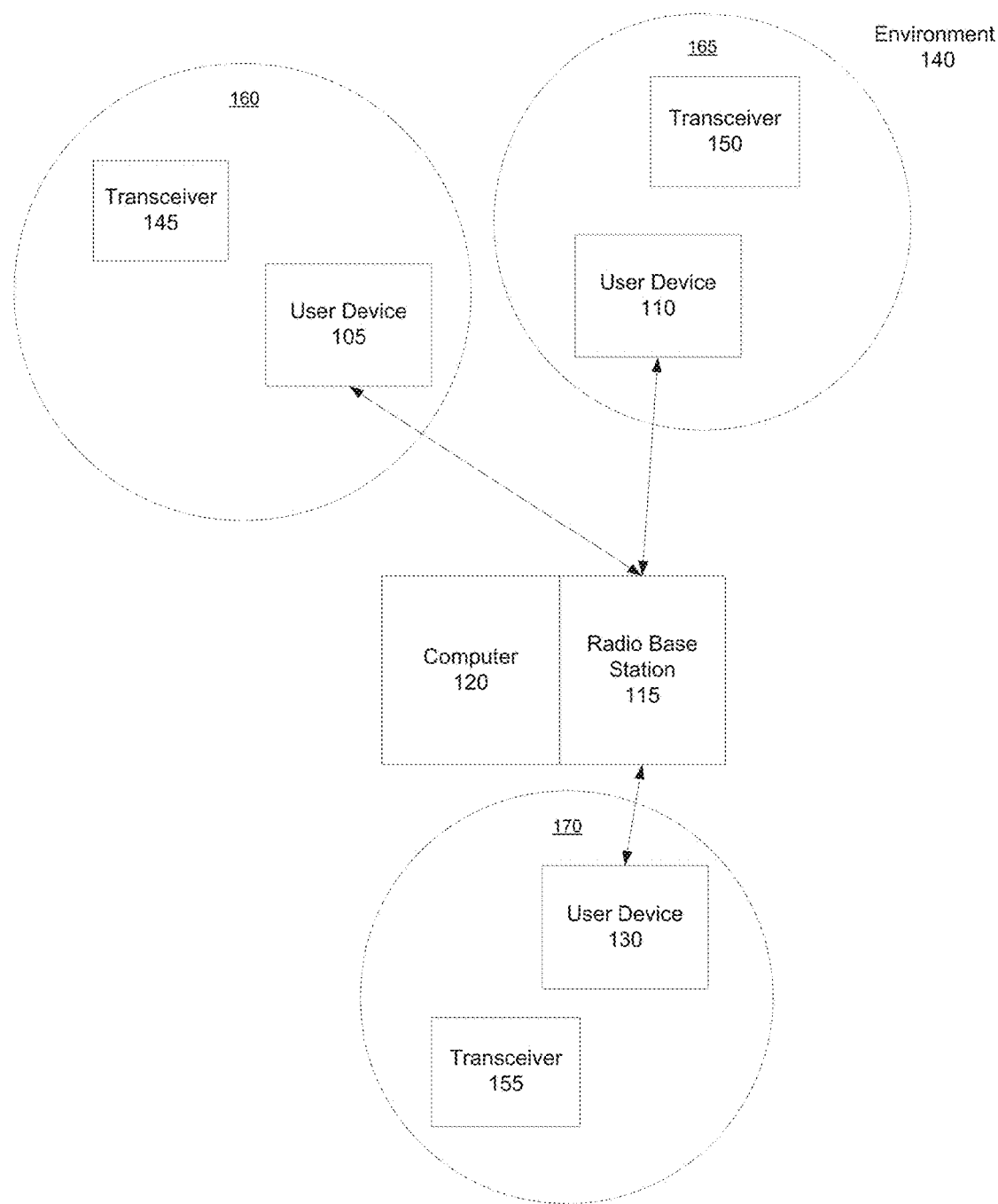
FIG. 1B illustrates a block diagram of an example environment for an observation platform for structuring a communication in accordance with other embodiments of the present technology.

With reference now to FIG. 1B, a block diagram of an environment 140 for structuring communications in an observation platform. Environment 140 includes user devices 105, 110 and 130, radio base station 115, computer 120, transceivers 145, 150, and 155, and regions 160, 165, and 170. Environment 140 comprises components that may or may not be used with different embodiments of the present technology and should not be construed to limit the present technology. Some or all of the components of environment 140 may be described as an observation platform for structuring a communication.

Transceivers 145, 150, and 155 are capable of sending and receiving signals to and from radio base station 115 and user devices 105, 110 and 130. Transceivers 145, 150, and 155 may or may not be networked to one another and to either radio base station 115, computer 120 or both. Transceivers 145, 150, and 155 may be transceivers such as wireless routers in a computing network. The transceivers may relay a communication from a user device to computer 120. A communication or signal may be routed through a plurality of transceivers before reaching computer 120.

In one embodiment, the transceivers may be uniquely identifiable such that a communication may comprise a characteristic that identifies the communication as being routed through a given transceiver. This identification of the transceiver, along with secondary signals, may be employed by computer 120 to determine a geographic location of a device or user. Thus, a characteristic of the communication may be an identity of a transceiver and comprises information that is indicative of a geographic position. Computer 120 may determine that a device is in a geographic region that is associated with a transceiver such as region 160 associated with transceiver 145. Computer 120 may also use geographic information and user motion characteristics to predict and pre-set association to the next likely transceiver.

In one embodiment, computer 120 determines the geographic location of a device based on a transceiver signal strength received at the device from one or more transceivers. For example, user device 130 may receive signals from both transceivers 150 and 155 each with a corresponding signal strength. The signal strength data is sent from user device 130 to computer 120 as a characteristic of a signal or communication sent to computer 120. The signal strength data is then used by computer 120 to determine the geographic position of user device 130.

Transceivers 145, 150, and 155 each have an associated region such as regions 160, 165, and 170. The regions may define the transmission range of the transceiver or may be defined based on some other criteria. In one embodiment, the regions may be described as wireless hotspots. Regions 160, 165 and 170 may be well defined geographical regions either indoors or outdoors and may be known to computer 120. Regions 160, 165 and 170 are depicted as not overlapping one another. However, the regions may or may not overlap one another. In one embodiment, computer 120 may determine the geographic location of a device based on its location in one or more regions. For example, user device 105 may be located in region 160. In another example, regions 160 and 165 may be overlapping and computer 120 determines that user device 110 is in the overlapping portions of region 160 and 165 because a characteristic of a communication from user device 110 indicates that user device 110 is receiving signals from both transceiver 145 and 150. Thus a characteristic of signal sent from a user device to computer 120 may be contents of a communication, a portion of a communication corresponding to an audible source, signal strength data of a transceiver, an identity of a transceiver, geographic position data, or other information.

In one embodiment, computer 120 determines the geographic motion, movement, or path of travel of a user based on transceiver signal strengths received at the device from one or more transceivers. Movement of the communications user device 130 may be derived from data regarding signal strength measurements made at one or more of the transceivers, where the signal strength is measured and sampled at successive time intervals, via well-known methods. For example, as a user moves about the region in environment 140, the signal strength will increase at one transceiver device and decrease at another. Movement of the communications user device 130 may also be derived from internal components in the device such as accelerometers, compasses, or barometers, again via successive time samples of acceleration data. This data may be used to detect a smaller range of movement.

Figure 1C:
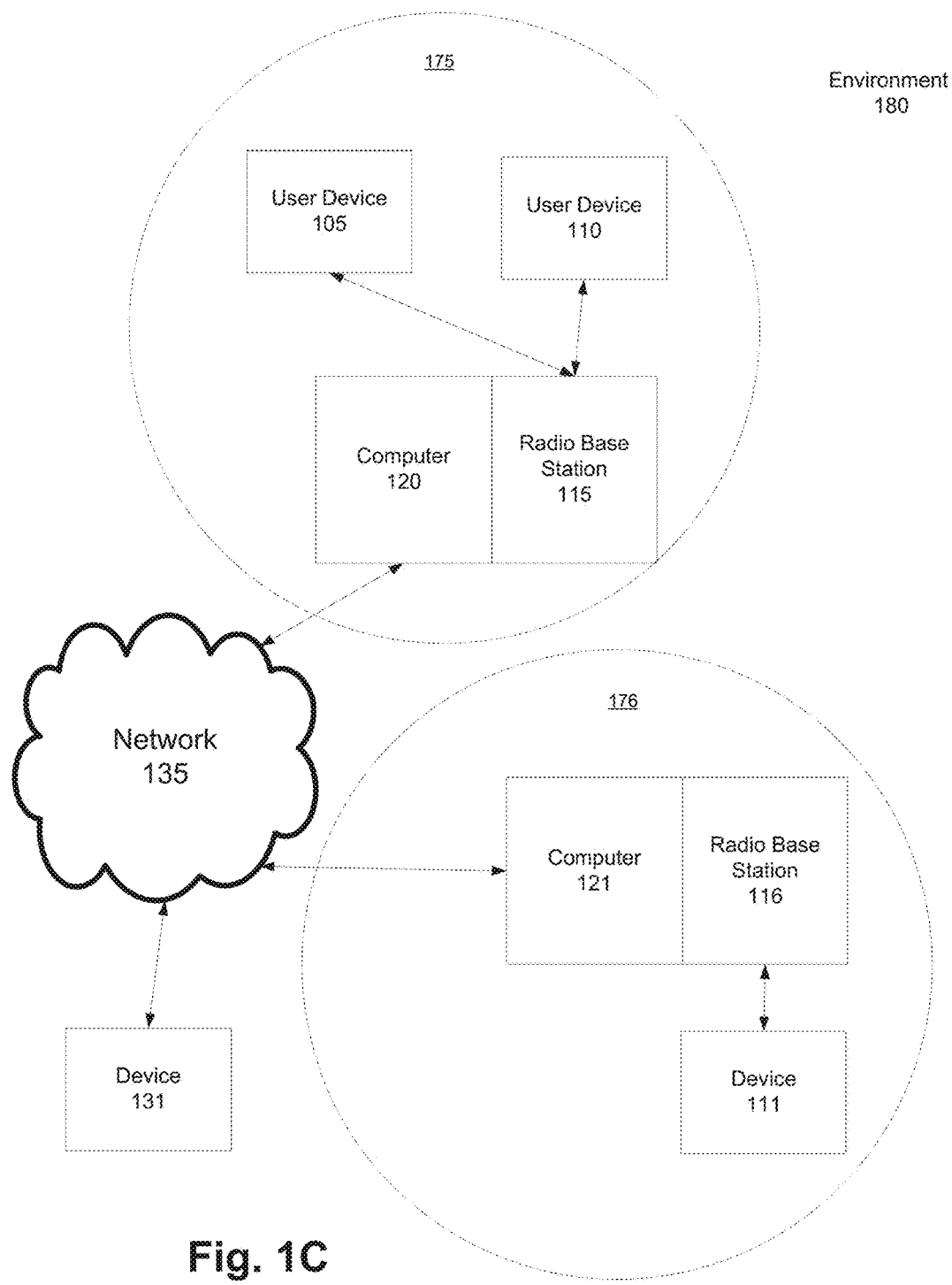
FIG. 1C illustrates a block diagram of an example environment for an observation platform for structuring a communication in accordance with other embodiments of the present technology.

With reference now to FIG. 1C, a block diagram of an environment 180 for structuring communications in an observation platform. Environment 180 includes user devices 105, 110, 111 and 131, radio base stations 115 and 116, computers 120 and 121, network 135 and regions 175 and 176. Environment 180 comprises components that may or may not be used with different embodiments of the present technology and should not be construed to limit the present technology. Some or all of the components of environment 180 may be described as an observation platform for structuring a communication.

In one embodiment user device 105 and 110 are located within region 175. The components depicted within region 175 may be described as an observation platform. Region 175 may be described as having a radio range, or span of operating distance. For example, radio base station 115 may have a physical limit regarding the distance which it may transmit radio signals. Therefore, a device outside of the radio range, such as devices 131 or 111 will not be able to communicate with computer 120 via a radio signal transmitted from radio base station 115. Additionally, user devices 105, 110, 111 and 131 may also have a limited radio range.

These limitations may be overcome by computer 120 relaying the communication to either device 131 or a second observation platform within region 176 via network 135. Therefore, user devices 105 and 110 may communicate with either device 111 or 131 where the communications are relayed by computer 120 and network 135. Region 176 may be described as a second observation platform with components that are duplicates of or similar to components of region 175. The regions 175 and 176 may comprises any number of communication devices or other components such computers, routers, and transceivers. Thus, the present technology provides for structured or disciplined communications between at least two user devices that may or may not be within radio range of one another.

In one embodiment, the communications between computer 120 and user devices 105 and 110 are accomplished via radio signals and the communications between device 131 and computer 120 are accomplished via network 135. In one embodiment, the connected between network 135 and device 131 is telephony call such that user device 105, which may not be a telephone, places a phone call to device 131, which is a telephone, via the observation platform. In such an embodiment, network 135 may comprise both a computer network and a phone network or cloud.

In one embodiment, device 131 and/or region 176 may be physically remote relative to radio base station 115. For example, all the components shown within region 175 may be located within radio range of one another at a first location, but device 131 and region 176 are located at a second and third location outside of region 175. These first, second and third locations may be separated by any length of distance. The second or third location may be hundreds or even thousands of miles away from the first location or may be less than a mile away but still outside of region 175. In one embodiment, computer 120 and radio base station 115 are located at a first physical address such as a street address for a building or other physical location, device 131 is located at a second physical address, and computer 121 and radio base station 116 are located at a third physical address.

In one embodiment, computer 120 and radio base station 115 are associated with a retail environment and region 175 includes the retail floor as well as an office or other area designated for associates, managers, or employees of the retail environment. However, computer 121 and radio base station 116 are located in region 176 are located at a second retail environment. The first and second retail environments may be related to one another such as both being a franchise of the same business or enterprise. Thus, a customer or associate may be located in region 175 associated with a first franchise, e.g. a first observation platform, and speak with an associate using device 111 in a second franchise, e.g., a second observation platform. The customer or associate may ask questions regarding the inventory of an item at the second franchise or speak with an associate at the second franchise that has knowledge not known by associates at the first franchise.

In one embodiment, where region 175 and region 176 each comprise separate observation platforms, the present technology is employed to manage and observe the observation platforms. For example, applications 814 of FIG. 8 may be employed with the observation platforms. These applications allow for the scalability of observation platforms such that a single user may have access to the data from a plurality of observation platforms and the ability to send messages to all or some of the devices associated with the observation platforms simultaneously in a scheduled transmission.

Figure 2:
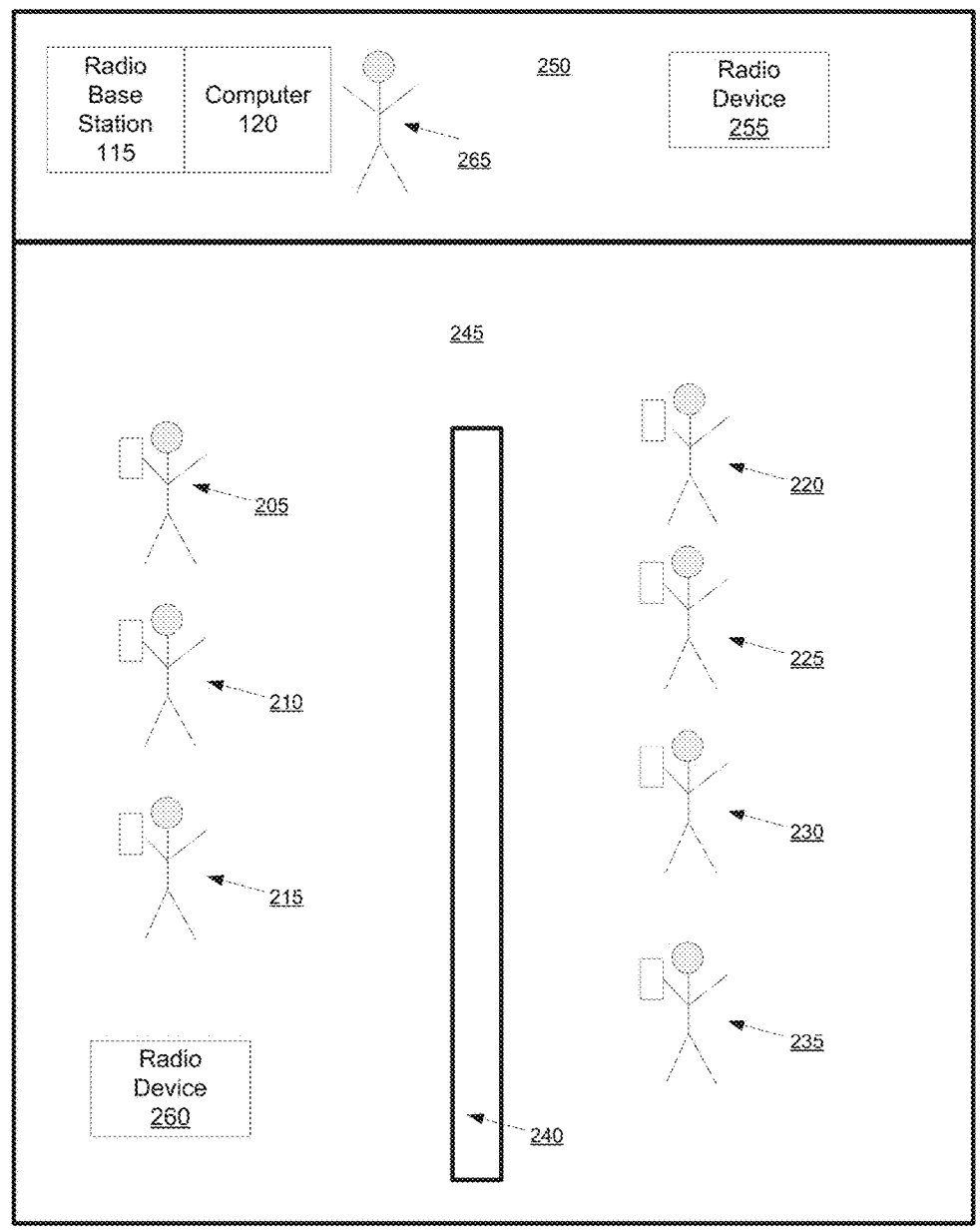
FIG. 2 illustrates a block diagram of an example environment for structuring communication in an observation platform in accordance with embodiments of the present technology.

With reference now to FIG. 2, a block diagram of an environment 200 for structuring communications in an environment. Environment 200 includes radio base station 115, computer 120, users 205, 210, 215, 220, 225, 230, and 235, structure 240, area 245, area 250, radio devices 255 and 260 and user 265. Environment 200 comprises components that may or may not be used with different embodiments of the present technology and should not be construed to limit the present technology.

Environment 200 depicts a setting in which the present technology may be employed. Environment 200 may be, but is not limited to, retail settings, public-stage floors, outdoor venues, concerts, police scenarios, disaster areas, and other environments where communications occur between users.

Areas 245 and 250 are depicted as being enclosed. However, the present technology may be implemented in an outdoor or indoor environment or a combination of the two. Users 205, 210, 215, 220, 225, 230, and 235 are depicted as each holding a device such as user device 105 of FIG. 1. The devices do not necessarily need to be handheld. Users 205, 210, 215, 220, 225, 230, and 235 may be a variety of different types of users. For example, the users may be associates and customers intermingled in a retail setting. Area 245 may be the retail floor while area 250 is a back office or other area designated for associates, managers, or employees of the retail environment.

Structure 240 may be a display, shelves, aisle divider, or other structure that physically separates spaces in area 245. For example, users 205, 210, and 215 are depicted as being in separate space of area 245 than users 220, 225, 230, and 235. Computer 120 may be able to interact with users 205, 210, 215, 220, 225, 230, and 235 and determine the user's geographic locations as well as act as a central hub for all communications between the users. In one embodiment, computer 120 recognizes a group of users associated with communication devices. The group may be based on a classification or type of user or may be based on a geographic location and other contextual information of said users. In one example, computer 120 recognizes that users 205, 215, 230, and 235 are associates and users 210, 220, and 225 are customers in a retail setting. The associates may be considered a first group and the customers a second group. In a second example, computer 120 recognizes that users 205, 210, and 215 are a first group in a separate space of area 245 than the second group of users 220, 225, 230, and 235. Computer 120 may then employ the recognition of groups to generate visual representations of features of the group and its communications. It should be appreciated that groups can simultaneously exist in many locations and are not constrained by building walls or geography. Groups can also be defined with the aid of secondary information such as communication patterns, engaged/available histories, motion vectors and geographic range and other context information captured or derived by the observation platform.

In one embodiment, environment 200 comprises radio devices 255 and 260 used for communication with user devices and radio base station 115. Radio devices 255 and 260 may or may not be networked with radio base station 115 to provide additional coverage or range for radio base station 115. For example, radio devices 255 and 260 may be antennas or radio repeaters for radio base station 115. In one embodiment, radio devices 255 and 260 are wireless routers for computer networking. Computer 120 may employ radio devices 255 and 260 to determine a geographic location of a user. Radio devices 255 and 260 and transceivers 145, 150 and 155 may each have the same capabilities and features as one another.

The geographic location or position of a user may be determined by computer 120 receiving periodic clues or evidence of the geographic location of the user device and then computer 120 infers or deduces the geographic location based on the evidence or clues. For example, the user device associated with user 205 may receive a plurality of signals from radio base station 115 and radio devices 255 and 260. Each signal has a unique signature at the current position of user 205. The signatures of each source are periodically sent to computer 120 or as a component characteristic of any communication. Computer 120 may then determine the geographic position of user 205 based on the signatures of each source and the known location of the sources e.g., radio base station 115 and radio devices 255 and 260. In one embodiment, radio devices 255 and 260 may be beacons transmitting radio signals such as Bluetooth or Bluetooth Low Energy (BLE, or ZigBee). In one embodiment, the user device knows its geographic position based on geographic position component which is part of the user device. The geographic position component may be a component device or chip that employs the global positing system, other satellite navigation system, inferred signals, radio signals from beacons, or RFID signals for determining a geographic location or position. A user device with a geographic position component may transmit the determined geographic position to computer 120 periodically or as part of a communication. Alternatively, an external device may supply geographic location of user devices using other standard industry methods. Thus computer 120 may know the location of a user at a given time based on the geographic position of the device associated with the user.

In one embodiment, user 265 interfaces with computer 120 to use the present technology to optimize communications. Computer 120 may determine and display performance metrics or visual representations regarding communications to user 265. User 265 may then use the performance metrics and visual representations to make decisions. For example, user 265 may be a manager of associates who can identify that a customer has asked for assistance at a given location but no associates have responded. The manager may then use the present technology to request an associated to assist the customer. In one embodiment, user 265 is able to directly use computer 120 and radio base station 115 to communicate with other users by individual identification, location groupings or contextual groupings.

In one embodiment, user 265 interfaces with computer 120 to use the present technology to optimize geographic location. User 265 may be a customer and requests help from computer 120. Computer 120 determines the associate nearest the location of user 265 and provides the current and updated location of user 265 until intercepted by the associate. In one embodiment, user 265 may request help verbally, not engaging computer 120, and that request is heard by all nearby associates whose context is "not engaged with shoppers."

In one embodiment, computer 120 derives performance metrics, business metrics or metrics from the communications between users. The metrics may be used to generate visual representations. The metrics and/or visual representations become part of the context information for the users and may be employed to make decisions. The metrics and visual representations may be sent to another computer system or device. A metric may be based on the behavior of a user, the context of the user, information carried by the tone and quality of voice, and the user's spoken or signaled communications.

A sales performance metric may be determined by linking sales with users, measuring busy (or "engaged with shopper") times of users, and ascertaining busy status of user. The busy status of a user may indicate that the user is engaged in a communication, a task, assisting a customer or otherwise occupied. A response time metric may also be determined by measuring the time it takes to answer a user's question, or how long it takes to receive assistance after asking for it. A customer satisfaction metric may also be derived based on the text of the customer's communication. A task performance metric may be determined by measuring the length of time an associate is currently engaged in performing said task, including noting pending and completed tasks. Metrics may be used by a manager to reward good behavior or correct undesired behavior. Additionally, because the communications and other audio information may be recorded, the communications may be used in training as examples.

Visual representations may be described as communication traffic intensity maps between users and/or groups such as who talks to whom, how frequently and at what time of day; who asks questions and who responds; who responds to tasks, when and how long it took to respond; and who has listened to which training podcasts, where they listened and when. Visual representations may also be described as location maps such as, a status of when users indicate that they are engaged, busy or available, when users ask questions; quiet areas where no communications or engagements are occurring; where users are not located; where selling tips were left and by whom; location-based-tasks and the times it takes to complete them; a path of where users have traveled geographically; and a map of the environment. With this observation platform for structuring communications, a more complete observation of many of the events in the interaction between and among all users can be observed, cataloged, and analyzed, providing a great deal of useful information to any manager of the overall process.

With reference now to FIG. 8, a block diagram of an environment 800 for connecting external applications and external devices to one or a plurality of of observation platforms. Environment 800 depicts multiple components and as a whole may be described as an Application Programming Interface (API) between applications and one or more observation platforms. Specifically, external devices and systems 801 depicts a wide array of IoT devices that can use the observation platform for alerting selected users of actions needed or that may query selected users for additional information or may query the observation platform for user contextual information or may allow users to instruct or control the IoT devices based on user context and policy Environment 800 comprises components that may or may not be used with different embodiments of the present technology and should not be construed to limit the present technology.

The right column of environment 800 refers to observation platforms 830 which specifically comprises observation platforms 832, 834, and 836. It should be appreciated that observation platforms 832, 834, and 836 have the same capabilities and features of the observation platforms described in FIGS. 1A-1C and 2. Moreover, observation platforms 830 may refer to the three depicted observation platforms but may also describe any number of observation platforms such as hundreds or thousands of observation platforms. In other words, the present technology may be used to manage, observe, measure, control, and otherwise operate with any number of observation platforms thus associating a large group of observation platforms with one another and providing for scalability in the management and use of a large number of observation platforms.

Figure 9:
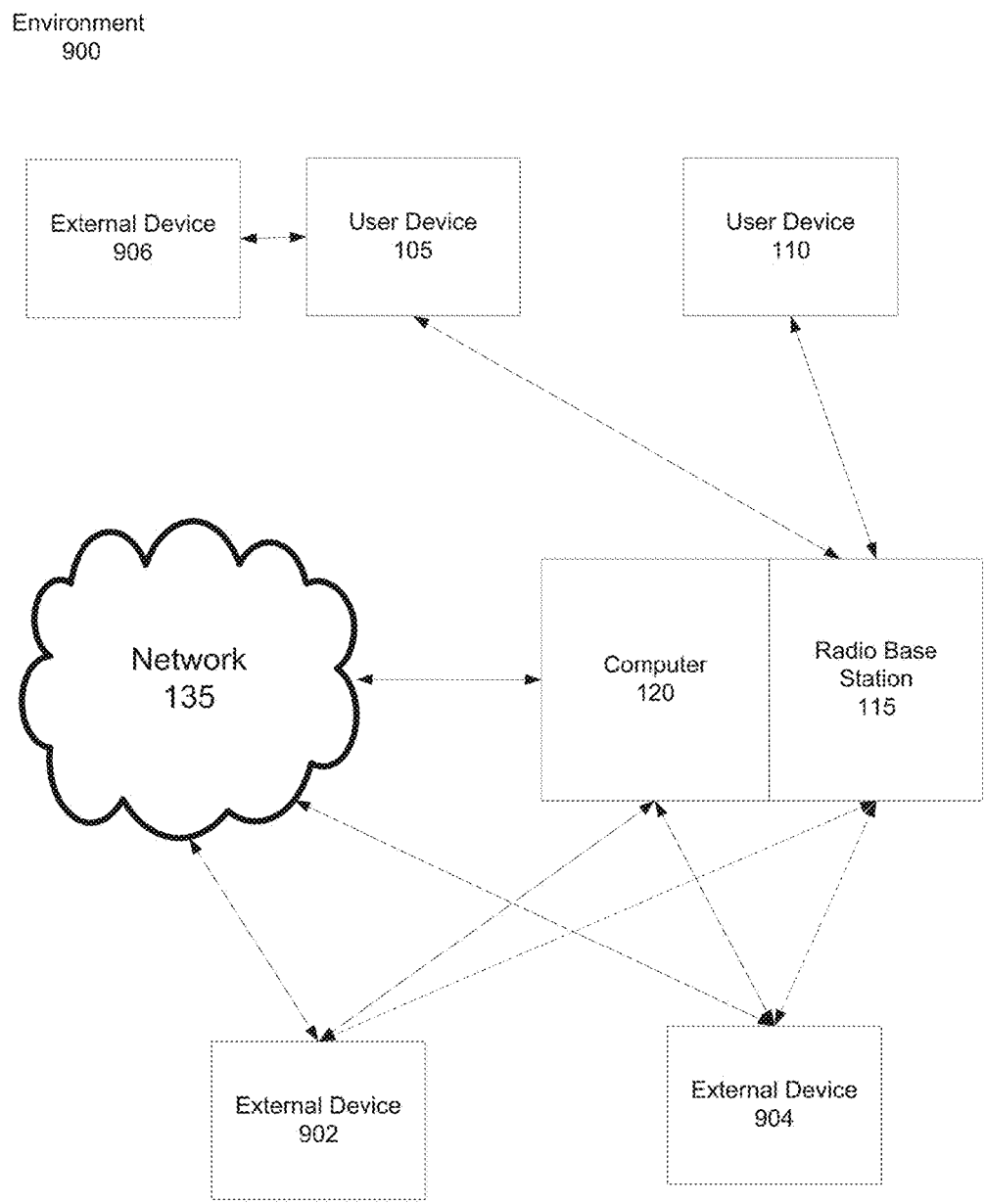
FIG. 9 illustrates a block diagram of an example environment for observation platforms using structured communications with external devices and systems in accordance with embodiments of the present technology.

Each of observation platforms 832, 834, and 836 are depicted with three devices, devices 838, 840, 842, 844, 846, 848, 850, 852, and 854 respectively. It should be appreciated that and observation platforms 832, 834, and 836 may have any number of devices associated with them and will likely have more than three devices associated with them. Devices 838, 840, 842, 844, 846, 848, 850, 852, and 854 have all of the same features and capabilities of user devices 105, 110, and 80 of FIG. 1C. Additionally, 838, 840, 842, 844, 846, 848, 850, 852, and 854 may be external devices that exist within the related observation platforms as shown in FIG. 9. Hence external devices may be present within and observation and may be communicating in a manner similar to the users, or external devices may be present remote from the observation platform and communicate as an external application as depicted in the left column of environment 800. External devices directly connected to observation platform may be capable of communicating using one or more of a variety of standards or protocols including, but not limited to, Bluetooth, low-energy Bluetooth (BLE), personal area networks such as ZigBee, radio waves, cell phone signals, and WiFi comprising all standard 802.x devices and protocols. External devices indirectly connected to the observation platform may be capable of communicating through Cloud Services 816 via standard Internet protocols using industry standard communication techniques to reach the Internet.

The left column of environment 800 depicts applications 814. The components of applications 814 may refer to applications executing on a computer system or systems but may also refer to specific purpose devices built for the present technology. In an embodiment where one of applications 814 refers specifically to an application, the application is carried out on a hardware computing device or devices and may make use of cloud computing techniques. In an embodiment where external devices employ proprietary software that communicates with the observation platform using standard Internet protocols, the application will communicate with the observation platform API of the present technology.

In one embodiment, external devices and systems 801 comprise external devices such as external devices 902 and 904 of FIG. 9 and/or third party systems. In one embodiment, external devices and systems 801 use standard internet protocols to communicate with cloud services 816 and either push information and instructions to the observation platforms 830 or pull information or instructions from the observation platform environment 830. In one embodiment, external devices 902 and 904 may be equipment communicating as devices on the internet as IoT devices using IoT protocols.

In one embodiment, web portal 802 refers to a web portal or service portal that is employed by a user to configure a local observation platform and the policies therein. Web portal 802 may be used to change network passwords and add remove, or reassign employees and their devices within the observation platform. Web portal 802 may also be used to create groups within the observation platform. For example, all of the devices that are used by a department such as the plumbing department in a hardware store may be placed in a group via the web portal 802. Additionally, web portal 802 may be used to establish connection information, API controls or security controls with external devices or establish enterprise policy for communicating with those external devices using structured communications.

In one embodiment, groupings may be determined by any of the characteristics determined by the context information of the users by each observation platform(s) and aggregated in the content distribution managers, such as: location, motion, communications patters or current user activity; or by pre-assigned roles, responsibilities or functions, such as: plumbing experts, register trained employees, housekeeping, or marketing executives. For example, a change in return policy may be communicated to a context generated group of all register trained employees as they arrive to the register area and must be acknowledged so that the web portal can show who has heard the message, where and when they heard the message, and where and when they verbally acknowledged the receipt. Groupings may also refer to groupings of the external devices.

In one embodiment, web portal 802 is a software application that is accessed via a uniform resource locator (URL) by any computing device that employs a web browser. Web portal 802 may comprise an application program interface (API) or graphical interface that is employed by a user of web portal 802. A user of web portal 802 may be required to provide authentication to access web portal 802. In one embodiment, web portal 802 has different levels of authentication allowing different users different levels of access each with differing levels of access or abilities to configure the observation platform. For example, local policies of observation platform may be configured by web portal 802. In one embodiment, web portal 802 is employed by users who are locally associated with the specific observation platform as the web portal 802 provides access and control that may only be of interest to a local user. For example, the local user may be a technical support specialist or store manager located within the physical environment associated with observation platform.

In one embodiment, the user of web portal 802 may be a technical support specialist associated with a plurality of observation platforms and is contacted by a local user of the specific observation platform and asked for assistance with configuring the specific observation platform.

In one embodiment, web portal 802 may be hosted or executed on computer systems local to the specific observation platform in which web portal 802 is used to configure. In one embodiment, web portal 802 is hosted or executed on computer system physically remote to an observation platform and is located in cloud services 816. Web portal 802 may be located in cloud services 816 and designed to configure any number of different observation platforms.

In one embodiment, content distribution manager browser 804 is a software application that is accessed via a uniform resource locator (URL) by any computing device that employs a web browser. Content distribution manager browser 804 may comprise an application program interface (API) or graphical interface that is employed by a user of content distribution manager browser 804. A user of content distribution manager browser 804 may be required to provide authentication to access content distribution manager browser 804.

Content distribution manager browser 804 is employed by a user to manage and control messages that are sent to a plurality of observation platform, the devices therein and the external devices connected via the API. In one embodiment, content distribution manager browser 804 can retrieve content for a message or can be employed to generate new and original content for a message. In one embodiment, the content is an audio file such as a WAV file that is the recording of an audible voice such that when the message is delivered to and accessed by a destination device, the message will playback the audible voice. The content distribution manager browser 804 may be employed by a manager to record a voice message which is then delivered to a plurality of devices.

In one embodiment, a message controlled by content distribution manager browser 804 is delivered to a plurality of devices simultaneously. This may be accomplished by content distribution manager browser 804 sending out the message to the various devices at the same time, or content distribution manager browser 804 may deliver the message to a plurality of observation platforms with commands or instructions to deliver the message to specified devices within the observation platform at a designated time. Delivering the messages to the devices may also be described as pushing the message. The manager using the content distribution manager browser 804 may designate the time a message should be available for the users and how long that message should be available to hear (end time). Alternatively, the content distribution manager browser 804 may be employed to deliver the same message to different devices or external devices at different times. For example, the message may be delivered to store managers within observation platforms at a designated time before the message is delivered to other employees within the same observation platforms. The user of content distribution manager browser 804 may also specify that additional content or messages are sent to different devices. For example, additional content may be sent to store managers or additional content may be sent to devices or external devices associated with a specific department in a retail setting such as the painting department.

The content distribution manager may rely on the inference of context and controlling policies running in the observation platform. IN one embodiment, a content message may be launched from the distribution manager for users who are near a geographic location for more than a set amount of time, who are moving within that, who have certain credentials (if the user is identified) and who exhibit communication patterns indicative of strong team connections. For example, a content distribution message regarding a new tool may be sent to all users who are near the tool department for more than 15 minutes within a five hour period, who are in nearly constant motion (indicative of probably not doing a maintenance task), who are listed as members of the "tool department" team (if the user is identified) and who interrelate with others in that department frequently.

In one embodiment, content distribution manager browser 804 is employed to specify who or what devices are to receive the message with its content. For example, the user of content distribution manager browser 804 may have authority over several different environments each with its own observation platform. The user may wish that the message only be sent to specified observation platforms within the plurality of observation platforms. Alternatively, the user may specify that all of the devices within all of the observation platforms receive the message, or only devices located within the physical boundaries of the observation platform at the designated time receive the message, or only devices associated with a specific department receive the message or only devices associated with store employees and not customers receive the message. Devices refer to the communication devices worn or carried by the users or may refer to external devices or IoT devices connected via the API. The possible options for specifying which devices receive a message and when are limitless. A message may also be generated and sent to a specific individual. In one embodiment, content distribution manager browser 804 employs the groups created by web portal 802 to determine which devices a message may be sent to. It should be appreciated that the content of the message may be a voice recording but may also be other content such as computer-generated text-to-speech, text, images, or video. In one embodiment, the message is sent to a given device with a command to notify the user of the device that there is a message received. The notification may be a light, a blinking light, a specific color of light, a sound, a textual notification, or any other type of notification that the device is capable of providing. Similar control and instructions can be delivered to external devices.

Content distribution manager browser 804 may be employed by a user that has high level access to the plurality of observation platforms. For example, a corporation may have hundreds or thousands of hospitality locations or store fronts that each makes use of an observation platform. The corporation may have a headquarters or central office with employees who have access to content distribution manager browser 804 with the ability and authority to send a message to anyone and everyone associated with the corporation.

In one embodiment, a device that receives a message from content distribution manager browser 804 automatically sends a confirmation back to content distribution manager browser 804 that the message has been received. Additionally, once the message has been accessed or heard by the user of the device, the device may send a message back to content distribution manager browser 804 that the messaged has been heard or otherwise accessed. In one embodiment, the message may be a mandatory message that the user of the device is required to access and listen to. For example, process 1200 herein describes various embodiments of mandatory messages and consequences, rules or policies associated with mandatory messages.

In one embodiment, manager application 806 a software application or app that is accessed via a mobile computer system such as a smart phone or tablet. In one embodiment, the mobile computer system executes an Android operating system. In one embodiment, the mobile computer system executes an iOS operating system. Other operating systems may also be employed. Manager application 806 may be an app available for download and installation on the mobile computer system. The manager application 806 is designed with an API or graphical interface specific to a mobile computer system such as a smart phone and to be used in the field by a user or manager associated with at least one observation platform. The user of manager application 806 may be a regional manager that has access to a plurality of observation platforms. The regional manager may regularly travel between the physical locations of the plurality of observation platforms and needs to have access to the observation platforms while physically remote and in the field on the go.

In one embodiment, manager application 806 allows the user of manager application 806 to communicate with or monitor any device or plurality of devices within any of the observation platforms associated with the user. Manager application 806 also is able to report statistics or observe or monitor communications with any of the observation platforms associated with the user. For example, the manager application 806 may be able to listen in to communications happening in real time within an observation platform or may be able to play back past recorded communications. In one embodiment, the manager application may operate in a manner identical to the mobile devices in the observation platform as a peer-like device. In this mode the manager application may broadcast or direct communications to specific devices, receive alerts and provide both a primary signal for communication and a secondary signal for determining geographic location. In one embodiment, the peer-like device may be able to operate and interact with devices within an observation platform without directly communicating with a central computer system. In other words, the central computer system may or may not be required for receiving and relaying messages from the manager application. The manager application 806 may also be employed to send announcements or messages similar to content distribution manager browser 804 to both devices and external devices. The manager application 806 may communicate directly through a network with a given observation platform or may use cloud services 816 and gateway 826 to communicate with a remote observation platform or devices and external devices associated with the remote observation platform.

In one embodiment, log-on tool 808 is a software application that is accessed via a uniform resource locator (URL) by any computing device that employs a web browser. Log-on tool 808 may comprise an application program interface (API) or graphical interface that is employed by a user of log-on tool 808. In one embodiment, log-on tool 808 is employed by a user of a device in an observation platform that is having trouble logging onto the observation platform verbally.

In one embodiment, support manager 810 is a software application that is accessed via a uniform resource locator (URL) by any computing device that employs a web browser. Support manager 810 may comprise an application program interface (API) or graphical interface that is employed by a user of support manager 810. Support manager 810 is a tool for a user to see network and system performance metrics, observe who was talking to whom, hear all or selected communications, respond in real-time with spoken responses, collect and play messages, and/or make, summarize real-time performance/user activities to determine trends or generate alarms and collect statistics from external devices Support manager 810 also keeps track of all devices within the observation platform as well as technical details such as the connection point a device is using, where the device is located within the physical boundaries of the observation platform, battery state of the device and if charged, where user has volume set for a device, environmental noise and sounds, and tracks communications and messages. In one embodiment, support manager 810 has an alarming feature that mines relational database 818 in the cloud and creates alarms or manipulates relational database to create alarms after detecting an anomaly. It should be appreciated that support manager 810 is designed to be used by a store help desk so they know what is going on in a technical way, a support center supporting a plurality of observation platforms, or an escalation center capable of troubleshooting and correcting more complex issues.

In one embodiment, third party apps and computer systems 812 refers to software applications and computer system created by third parties to be implemented within the observation platform(s). For example, a third party may create an application that makes use of the data generated by the observation platform. Such software may then sends results, reports, alarms, or other data back to the users within the observation platform for immediate action or to be stored to hear later; or to the web portal for decision support, action planning or coordinating immediate actions within the observation platform(s).

In one embodiment, third party apps and computer systems 812 refers to other software applications and computer system created by third parties to be implemented within the observation platform(s). This third party application may make use of externally derived data that is relevant to the operation of the enterprise which needs to be communicated to groups of observation platforms or groups of uses in near-real-time per the policies of the enterprise and the context of users. For example, door counter or video derived traffic information may be used to alert a group of uses, selected by context and policy, within an observation platform that action is necessary to improve coordination on the floor. Additionally, this third-party application information may be aggregated within the content distribution manager portal application so that managers, district managers, regional managers or enterprise executives may overview or alter patterns of operations between a plurality of observation platforms.

In one embodiment, cloud services 816 refers to cloud computing techniques and hardware that may be employed in cloud configuration 828 to assist observation platforms and embodiments of the present technology. Relational database 818 may be located in cloud services 816 and comprises data generated and related to one or more observation platforms. Platform configurations 820 refers to configurations that may be default configurations and policies to be implemented and used by a specific observation platform. Message scheduler 822 and message broker 824 may be software applications located in cloud services 816 and employed by external devices and systems 801, and content distribution manager browser 804 and manager application 806 as well as other applications in applications 814 to send and/or receive messages to/from devices located in observation platforms 830. Gateway 826 is a security gateway located in cloud services 816 and is employed to ensure that only authorized programs and users have access to the observation platforms.

With reference now to FIG. 9, a block diagram of an environment 900 for observation platforms using structured communications with external devices and systems. Environment 900 comprises components that may or may not be used with different embodiments of the present technology and should not be construed to limit the present technology. User device 105, user device 110, computer system 120, radio base station 115, and network 135 may have all the same features and capabilities as those depicted in FIG. 1A.

In one embodiment, external device 902 and external device 904 are external devices such as electronic physical objects that are associated with the observation platform. External devices 902 and 904 may have all the same features and capabilities of each other or may be different and distinct from one another. While environment 900 only depicts two external devices, it should be appreciated that an observation platform may have any number of external devices associated with it where each external device may be similar or different from one another. External devices may refer to any number of external devices commonly referred to as cameras, video cameras, motion sensors, environmental sensors, a weight sensor, thermometers, automation devices, medical devices, handheld mobile devices, time clocks, door counters, interactive display kiosks, alert buttons, user identification systems, proximity detectors, alarms, etc. An external device may have more than one sensor or more than one sensor type and may comprise a combination of features.

The structured communications of the observation platform as described above may also be employed to allow users to directly and immediately interact with external devices such as external device 902 through the structured mechanisms of the observation platform such as: interpretation of spoken words (e.g., speech-to-text), geographic location, optional identification of end users and their respective roles and responsibilities. In one embodiment, an observation platform is used to connect enterprise users with each other regardless of location and connect with internal computer systems that determine the most appropriate action given the context of each user by action, location, history, recognition of spoken words and optional personal identification.

External devices 902 and 904 may able to send data to computer system 120 via network 135 such as through a Wifi interface. In one embodiment, external devices 902 and 904 can communicate with computer system 120 through radio base station 115 or directly with computer system 120 through a wired connection or a near field communication such as Bluetooth or low energy Bluetooth. External devices 902 and 904 may also be able to receive commands from computer system 120 such as to turn on or off, adjust a setting, send gathered data, change the rate at which data is gathered, etc. It should be appreciated that external devices 902 and 904 can also communicate with each other through the observation platform as determined by the context of each external device and the enterprise policy and inference of the observation platform to structure the communications.

With reference now to FIG. 9, a block diagram of an environment 900 for observation platforms using structured communications with external devices and systems. Environment 900 comprises components that may or may not be used with different embodiments of the present technology and should not be construed to limit the present technology. User device 105, user device 110, computer system 120, radio base station 115, and network 135 may have all the same features and capabilities as those depicted in FIG. 1A.

In one embodiment, external device 902 and external device 904 are external devices such as electronic physical objects that are associated with the observation platform. External devices 902 and 904 may have all the same features and capabilities of each other or may be different and distinct from one another. While environment 900 only depicts two external devices, it should be appreciated that an observation platform may have any number of external devices associated with it where each external device may be similar or different from one another. External devices may refer to any number of external devices commonly referred to as cameras, video cameras, motion sensors, environmental sensors, a weight sensor, thermometers, automation devices, medical devices, handheld mobile devices, time clocks, door counters, interactive display kiosks, alert buttons, user identification systems, proximity detectors, alarms, etc. An external device may have more than one sensor or more than one sensor type and may comprise a combination of features. Another term that may be used to describe external devices is the Internet of Things (IoT) devices.

The structured communications of the observation platform as described above may also be employed to allow users to directly and immediately interact with external devices such as external device 902 through the structured mechanisms of the observation platform such as: interpretation of spoken words (e.g., speech-to-text), geographic location, optional identification of end users and their respective roles and responsibilities. In one embodiment, an observation platform is used to connect enterprise users with each other regardless of location and connect with other computer systems that may determine the most appropriate action given the context of each user by action, location, history, recognition of spoken words and optional personal identification. In other words, the decision of the most appropriate action may be determined by the observation platform using context, enterprise policy and inference for users and external devices, or the decision of the most appropriate action may be made by other computing systems that can extract the user and external device context, and optionally the enterprise policy, from the observation platform.

External devices 902 and 904 may able to send data to computer system 120 via network 135 such as through a separate WiFi interface or a standard connection to the Internet. In one embodiment, external devices 902 and 904 can communicate with computer system 120 through radio base station 115 or directly with computer system 120 through a wired connection. External devices 902 and 904 may also be able to receive commands from computer system 120 such as to turn on or off, adjust a setting, send gathered data, change the rate at which data is gathered, etc. It should be appreciated that external devices 902 and 904 can also communicate with each other through the observation platform as determined by the context of each external device, the enterprise policy and inference of the observation platform to structure the communications.

In one embodiment, external device 906 may enter the observation platform environment being carried by a shopper or visitor. External device 906 may also be running an application from the store, enterprise or a third-party that uses beacon detection to determine proximity to a display or a specific location. Once a beacon is detected, the application contacts the store or enterprise computer system for special information (e.g., a deal or sales special) or additional information. This communication between the external device and the enterprise computer system takes place without being a part of the observation platform. User device 105 may contain a beacon transceiver that triggers external device 906 to contact the enterprise computer system and report contact with the beacon device identified as a part of user device 105. Thus user device 105 becomes a mobile beacon that is attached to a user who can receive additional information via the API using the structured communication of the observation platform.

Many external computer systems and external devices have embodiments of the present technology where the data gathered by the external devices is of the urgency or relevance that it is valuable to be heard by one or more of the users associated with the observation platform such as hourly employees, managers or other users across an enterprise. In other examples one or more hourly employees, managers or other users may wish to interrogate, modify or control the external devices via a speech command or a set of actions that indicate the need for pushing information to the external device. The present technology allows such a push to the external devices to take place via the user device and the observation platform. In one embodiment, the user may control the external device via voice commands by using a device with an interface that has only a single button that when pressed gathers the user's audible voice and sends the voice as a communication to the computer system associated with the observation platform.

Central to structuring the flow of audible information within the enterprise is the observation platform. The observation platform is used to connect users to each other and to electronic information via external computer systems, databases and external devices. The communications control inherent in the observation platform is mediated and the observation platform directs information passing from/to the most appropriate users based on factors such as engagement time, available times, location maps, talk time, listen time, number of listeners, geographic location of device, locations traversed including speed and direction, length of communication, who initiated communications to which groups and individuals, presence information, type of communication, keywords, keywords spoken or listened to, speaker's tone, speaker's emotion, lengths of speeches, lengths of speech segments, what policies are used for directing the communications, when and where two or more devices dwell in close proximity to each other or to specific locations, speed of movement and pausing of listening individuals during/after talking or listening, and frequency that listeners delay hearing a message or drop out from what an identified speaker is saying, and/or promptness of responses to what was heard. The observation platform is capable of determining whether voice packets should be interpreted, stored or instantly routed to other users or other computer systems.

For embodiments that comprise near real-time communications with external systems, devices or computer-based equipment would improve the effectiveness, productivity, knowledge or ability to complete tasks for users, a simple, reliable and state-free interface is included for connecting between the observation platform and the external equipment. The present technology describes that interface and the relevance of having that interface to users of the system.

Figure 10:
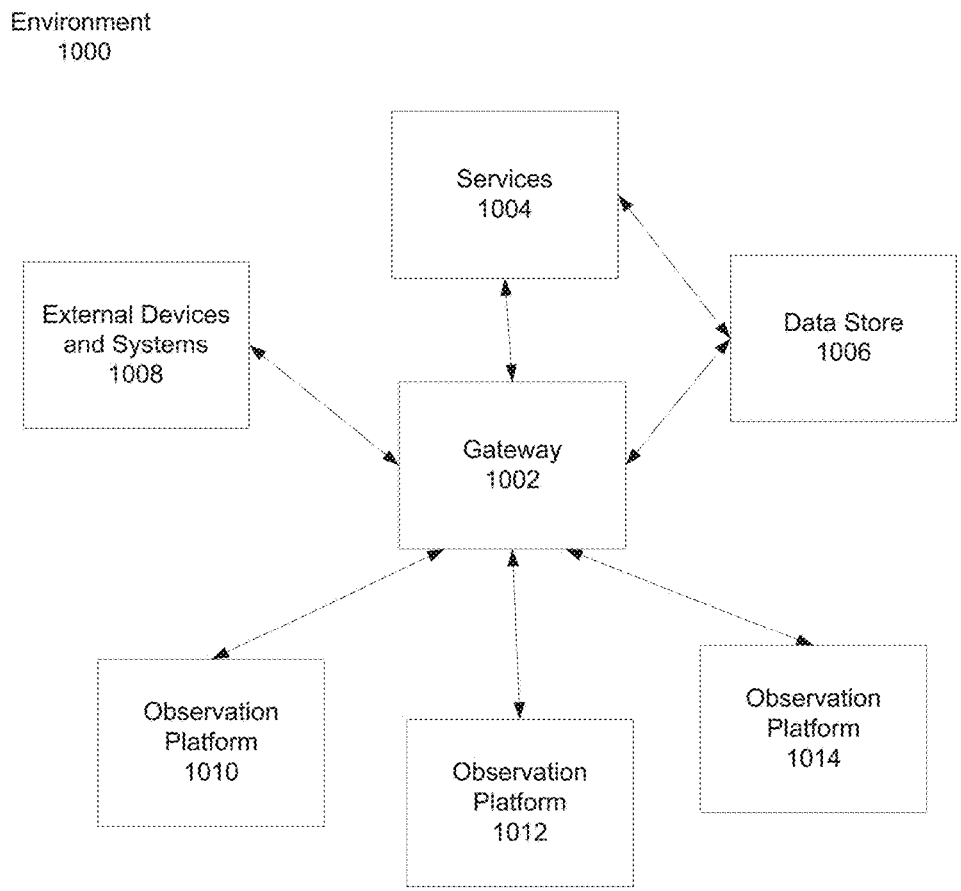
FIG. 10 illustrates a block diagram of an example environment for observation platforms using structured communications with external devices and systems in accordance with embodiments of the present technology.

With reference now to FIG. 10, a block diagram of an environment 1000 for observation platforms using structured communications with external devices and systems. Environment 1000 comprises components that may or may not be used with different embodiments of the present technology and should not be construed to limit the present technology. Environment 1000 comprises gateway 1002 which may comprise an application program interface (API) and may be described as an API gateway.

Environment 1000 depicts how the present technology offers a simplified, seamless and state-free interface into one or more observation platforms so that external devices and computers can get time-sensitive or attention-sensitive messages into the ears of the users, in-the-moment or at the most appropriate time as determined by the logic of the observation platform.

In one embodiment, an external device can send an audio file message directed to a specific user or a specific grouping of users by addressing a known user, plurality of users, or user(s) location directly. Alternately, the external device can raise an electronic alert whereby the observation platform receives the alert via the API and is programmed to create and distribute audio information relevant to the alert event to the optimal set of users as determined by the logic and inference engine of the observation platform. Similarly, users within the observation platform can signal, control or update external device using either a speech command or a set of actions indicative of an appropriate push message or instruction to the external device The API gateway 1002 is the interface with external devices and provides: 1) a simple messages format for exchange in either direction, 2) multiple levels of security, 3) a stateless interface, 4) rate limiting, 5) load balancing and 6) distributed denial of service (DDoS) protection. The design of the API is to allow devices that can communicate over the Internet to communicate to the observation platform with the same simplicity as communicating with a local computer or with other Internet-based equipment.

In one embodiment, services 1004 represents the services that are available to an observation platform such as observation platforms 1010, 1012, and 1014. Observation platforms 1010, 1012, and 1014 may each represent a different physical site such as different locations of the same retail chain or enterprise that are owned by a common owner. Gateway 1002 and services 1004 provide support and other analytics to the high level users of observation platforms 1010, 1012, and 1014. Data store 1006 stores the data from observation platforms 1010, 1012, and 1014 such as context information, statistics, user data, location data of devices within the observation platforms, etc. Gateway 1002 also provides access to external devices and systems 1008 which represents external devices such as external devices 902 and 904 as well as services offered by third party vendors to observation platforms 1010, 1012, and 1014. For example, external devices and systems 1008 may be an IoT device, third party apps, enterprise apps, etc. In one embodiment, external devices and systems 1008 represents the external devices or IoT devices associated with an observation platform as described herein.

In one embodiment, the interface message structure for gateway 1002 is based on a Representational State Transfer (REST) architecture and with connections via HTTP or HTTPS protocols through the Internet. As used herein, REST is a standardized and coordinated set of constraints applied to the design of components in a distributed system that allow a high-performance and maintainable architecture. RESTs separation of protocol interactions simplifies component implementation, reduces the complexity of communication semantics, improves performance, and increases the scalability of server components. REST enables intermediate processing by constraining messages to be self-descriptive: interaction is stateless between requests, standard methods and media types are used to indicate semantics and exchange information.

In one embodiment, gateway 1002 is secure and employs various techniques to ensure security. For example, gateway 1002 may require a shared key authentication before any communication can take place. The authentication would take place off-line via a separate secure communication link. Every request for authentication requires the corresponding API key. Transport layer protection is provided by standard HTTPS protocols used extensively in Internet communications today. Once access is granted to the API gateway, additional security measures are employed such as cryptographic Transport Layer Security (TLS).

In one embodiment, gateway 1002 provides additional elements of security for applications via a technique for Authentication, Authorization and Accounting (AAA). The interface simplifies connectivity to upstream or distributed security servers such as Remote Authentication Dial in User Service (RADIUS).

In one embodiment, gateway 1002 allows for four basic types of information flows in an observation platform through gateway 1002 to/from an external device or a plethora of external devices:

1. Information pushed from external devices to users of the system
2. Information pushed from users of the system to external devices
3. Information pulled from users of the system by external systems
4. Information pulled from external devices by users of the system These information flows can be used across multiple observation platforms and across the span of the Internet to provide actionable information for users through audible information in their ears. Information flowing from users to the external device is initiated through speech commands; or via actions, keyword recognitions or physical motions that are recognized by the observation platform as a request for information or control. The observation platform uses its internal logic, user context, inference engine and enterprise policies to determine the individuals or external systems that are most appropriate to receive the information.

Below are some examples for each of the four basic types of information flow showing how the gateway and observation platforms of the present technology can be used with external devices to improve information flow. The specific examples are not intended to limit the present technology, but illustrate specific embodiments of how the present technology may be used.

1. Information Pushed from External Devices to Users of the System

Alert Buttons

Enterprises and stores employ third-party alert buttons to signal employees that someone needs assistance with a task or in a given location. These third-party alert buttons can be connected via the API so that employees hear an audible indication that an "assistance needed" button has been depressed. The observation platform may then alert one or more employees based on engaged/available status, role, current location or past movement history. For example, there might be a "customer assistance" button in hardware, near a promotional display or near the elevators in a hospitality environment. By pressing the button, an electronic signal is processed by a third-party system which generates a signal directed to the observation platform via the Internet or alternate network connection. The observation platform receives the signal from the external equipment and uses stored policy to send a verbal or visual indicator to the most appropriate user(s). The most appropriate users may include: the user closest to the button, several users closest to the button, users that are identified as having expertise relative to the button function, users in other locations that could respond to the button request or other external systems that are notified as part of observation platform policy and inference process.

Interactive Display Kiosks

Stores, hotels, warehouses and events use third-party terminals or kiosks to allow visitors or employees to indicate the need for personal assistance or to signal that an action should take place. For example, a store may have a kiosk where customers identify themselves and press a button for product pick up. The customer presses a button on the screen and a signal is sent to the observation platform via the API. The observation platform then plays a verbal message to the most appropriate associate(s). In this case, the most appropriate associate is a user who is identified with the role of "fulfillment" and who is logged into the time-clock system and who is not in "engaged" mode. If such an associate cannot be found, the observation platform escalates the request to the manager-on-duty.

Software within the display kiosk detects shopper activities and signals what items on the screen are being examined and for how long they are being viewed. The software of the third-party system decides that there is sufficient interest in an item shown in the kiosk and requests human attention via the observation platform. The display may signal the observation platform regarding the shopper kiosk activities, products being viewed, dwell time at the kiosk or shopper-initiated actions within the kiosk. The kiosk signals the observation platform of the activity and the observation platform uses the internal inference and policy to dispatch time-critical verbal or visual signals to the user(s).

For example, a shopper may be looking at refrigerators in the kiosk and the kiosk determines that a salesperson should be notified. The kiosk signals the observation platform via the API which then sends a message such as, "customer researching high-end refrigerators at kiosk number seven" to the most appropriate sales associate(s). The most appropriate associate(s) includes those associates trained in refrigerators who are not busy with other shoppers, not on break and who are in the geographic region of appliances. Other characteristics of the shopper and associate matching may be processed by either the kiosk or the observation platform.

Door Counter

Door counter information can get routed to associates on break, in high-margin locations, in "greeter" locations or to managers so they can call in more associates. For example, if there is large influx of visitors in a 15 minute period, the door counter notifies the system via the API of the high visitor arrival rate. The system then sends a message to one or more users who are remote areas of the floor that an influx of visitors have arrived and they are needed at their respective zones.

Time-Clock and Workforce Management Systems (WMS) Events

Coordinating time-clock events with the observation platform has advantages for a store, such as informing managers of approaching overtime situations for individuals or for employees not clocked in, but who have identified themselves on the observation platform.

For example, an employee may arrive at work and forget to clock-in on the time-clock system. The time-clock system reports all clock-in, clock-out events to the observation platform. If the employee chooses to identify himself to the system, the system will know that the employee is on the system, but not clocked-in. The system then sends a message to the employee or a manager depending on the policy defined by the enterprise in the observation platform.

For example, a workforce management system may indicate the beginning or the end of a break period for an employee. The WMS communicates to the observation platform via the API and the platform uses policy to determine if the message should interrupt an employee, be played live or sent as a message to be retrieved later.

For example, a workforce management system may assign a task to user and communicates that task via the API to the observation platform. The observation platform uses inference and policy to determine the best person to assign the task based on user identity, user role, recent user activities and user location. Once the task is assigned and then completed, the user can indicate to the system that the task is complete (See Information Pushed from Users to External Devices below).

For example, the task management system might request a reorganization of a part of the enterprise or retail floor. The observation platform then uses context, policy and inference to assign this task to set of users defined by their location, their prior and current motions, there engaged/available status, their role and their responsiveness to the request. In one instance, the task may requested of the first user to enter a location zone who is available (not engaged), who has a history of spending time in that region and who does not have the role of "Sales Leader."

Video Camera Systems Interactions

Third-party video systems may interpret information from the enterprise floor and send messages to the observation platform for immediate or near-term action from users. Such information may include:
  there are many shoppers in a zone, push a message to associates and management
  increasing register queue
  shopper dwell times at products or displays
  high number of shoppers entering a store
  suspicious movements indicative of shoplifting
  shoppers in high-margin zones
  low level of shopping carts Shopper and Visitor Identification System Interactions Third party systems using Bluetooth, Bluetooth Low Energy (BLE), cell-phone signals or WiFi may identify visitors and shoppers from past visits or from loyalty databases. Third party systems that can determine the identity of shoppers and their location within an enterprise can push relevant information to employees or sales associates via the observation platform.

For example, if a shopper is identified by an external system, that system can send a message via the API to the observation platform which then uses inference and policy to notify the associate who last helped that shopper that the shopper is in the store and where the shopper may be located. If that associate is not on the system or is busy with another shopper, the policy may determine that an associate with similar skills or characteristics is on duty and notify that associate of the location of this known shopper along with relevant information regarding the shopper.

Proximity Detection Systems

An external device may comprise a proximity sensor that detects when a user or person is near the sensor. The sensor may detect the persons presence through a variety of means, such as detecting a cellphone or WiFi signal, and then detects that the person has been lingering near a location for certain amount of time. The sensor may use the API to the observation platform to pass information about the proximity of the person to the detection site and may also pass along an alert that the persons lingering time has exceeded a threshold. Alternately, the observation platform may receive updates of the person's proximity via the API from an external system that received information of the persons location via a beacon interactions and use that person's identity and stored information to determine if action of one or more of the users would be beneficial to the enterprise. For example, the information may be useful to determine when a plurality of customers are in a particular zone, when a customer is lingering at a display, when a customer device is interacting with a beacon, or if a customer arrives at a counter and may be in need of assistance.

Special Promotions or Deal Interactions

Third party systems can indicate when special information could be presented to visitors or shoppers based on factors such as store activity, user location or visitor location, identity and history of visitors or shoppers. The observation platform can then communicate to users of the observation platform relevant information such as:
  Identity of visitors and shoppers as identified by external devices and enterprise systems
  Demographic identification of visitors or shoppers as identified by external devices
  Visitor or shopper location within the enterprise as identified by observation platform or by external devices
  Prior purchases or activities as identified by enterprise systems
  Visitor or shopper preferences as identified by enterprise systems
  Special deals or promotions that may interest the visitor or shopper as identified by enterprise systems.

Users within the observation platform can then approach the visitor or shopper with background knowledge and potential special offers of interest. In this case, the observation platform may select a single user or a plurality of users for presenting this information based on context, enterprise policy and inference as in the above examples.

In one embodiment, a customer in a retail environment or a visitor in an enterprise environment might be carrying a smartphone or tablet that can detect the presence of a beacon while running an application designed to react to beacon detection. The user device within the observation platform may be capable of acting as a beacon allowing the customer or visitor to detect the local proximity of the user, thus making the users effectively mobile human beacons. The beacon detection algorithm in the customer or visitor application then communicates with the store or enterprise system to indicate the visitor is in the near proximity of a user. The enterprise system may then use the API to push information to the observation platform that one or more users are near the visitor. Additional information may passed via the API to the observation platform such as information about the visitor and the visitor's history with the enterprise. The observation platform may then use context and policy to pass the relevant information to the most appropriate user or users of the system. In one embodiment, the external system may associate the user (if known) with the customer so that at check-out, the POS system can credit the user with the sale.

Failure Alarm Interactions

Many types of enterprise equipment are capable of reporting failure or alarm conditions such as refrigerators, door alarms or light bulbs. These third-party devices may communicate with the observation platform the state or condition of the monitored equipment and the observation platform will use inference and policy to determine which user(s) should hear the alarm or failure.

For example, if a refrigeration unit detects the temperature is beyond a set-point, the unit can connect to the observation platform via the API and send an alert message. The observation platform uses inference and policy to determine that the users to hear the alert are those users with the role of either "maintenance" or "refrigerated foods" and who are located near the reporting unit and who are not engaged in a task or with a customer. The observation may keep the alert active until a user declares that the problem is solved or is being addressed.

Buy-on-Line-Fulfill-in-Store Interactions

When a shopper requests to purchase a product on a website and pick it up in the store, the website must check the inventory data and determine if it is likely that the product is in stock for the customer. If the inventory indicates the quantity available is less than a threshold amount, the website may request the observation platform have an associate verify there is a product in stock and to pull that product for customer pick-up.

For example, the customer is attempting to purchase a blue lampshade on the website. The website checks the inventory database and discovers there is only one in stock at the store. The website then sends a message to the observation platform via the API to verify the product is actually on the shelf and available. The observation platform then sends a message to one or more sales associates on the floor who are the nearest, and not engaged with other shoppers. When the sales associate pulls the product from the shelf, he responds with a command indicating he has the product. The API then sends the confirmation back to the website for verification to the customer. Conversely, if the product is not on the shelf, the sales associate uses a different command and the website now indicates that the product is not currently available in that store.

Enterprise Website Interactions

A shopper, customer or visitor may request assistance in a given department via an application on a smart device or wearable. A shopper, customer or visitor may request product information via an application on a smart device or wearable.

For example, if a shopper is using the store application and requests help from an employee, the application can instruct the observation platform that help is requested via the API. The observation platform then uses context, enterprise policy and inference to determine one or a plurality of users who are most appropriate to respond. In one instance, the plurality group may include the users who are not engaged (available), who are within 30 meters of the requester, and who respond most quickly to the audible signal for the request.

2. Information Pushed from Users to External Devices: Reporting

Reporting relevant enterprise information to central repository or database including: inventory shortages to an inventory control system, shelf inventory levels to a task management system for re-stocking, lost sale reasons to a database, competitive information reports to a competitive database, room status for hospitality operations, and maintenance and repair requirements to a task management database.

Control of External Devices

Many different features or capabilities of an external device may be controlled including but not limited to: temperature or lighting, display options and highlights, and kiosk behaviors and displays, door lock controls, background music control, and interactions with other computerized systems via the API.

The observation uses the context of the users, enterprise policy and inference to determine the authority of the user to control the external device(s) and which of the plurality of the external devices are most appropriate to control.

Connection to Public Address Systems

If the enterprise contains a public address system, a user can push a message to the public address system via the API. For example, a user at the front desk in a hotel gets an important phone call for a guest who is likely in the lobby. The user can say a command such as, "public address lobby" and the observation platform will respond with " . . . go ahead." The user then delivers the message and the observation platform formats a message for delivery to the external public address system through the API.

Task Completion Confirmation

Confirmation of task completion, if a task initiated by an external system has been routed to a user within the observation platform, the user can verbally confirm that the task was completed and the completion message will be sent back to the initiating system via the API.

For example, if a task management system indicates that certain shelves need to be checked for inventory, the task management system issues a command to the observation platform that is sent to the most appropriate employee(s). When the employee inspects the shelves, he indicates either that there is sufficient inventory or can push information to the external task system that additional inventory is needed. In a separate process the external task management system would then initiate tasks for others to move the low-count products (SKUs) from back rooms to the shelves.

Response to Alerts or Alarms

Alert and alarm systems may require an acknowledgment response in order to stop the request for attention. The API can be used to provide a positive acknowledgement from users of the observation platform. For example, an "assistance needed" button is pressed by a visitor and the request for assistance is passed through the API, translated to an audible message and routed to the most appropriate user(s). When a user responds to the request, they say a command such as, "I've got it," and the observation platform reports back to the system requesting assistance that the request has been cleared. If the external system requires additional information such as the user identity or where the user was located when responding, the observation platform can use policy to include such information in the response through the API.

Task Completion, Verifications and Acknowledgments

In one embodiment, the present technology can push information to an external device regarding a task completion verification or acknowledgment.

Alarms Reporting

In one embodiment, the present technology can push information to camera systems for LP operations or to fire alarm systems. For example, a user in a retail environment might notice a suspicious shopper and become concerned with loss prevention. The user could issue a command such as "Code 13 at jewelry;" which means there is suspected shop lifter in the department. The observation platform, using context, policy and inference then sends a machine instruction to the camera system to focus on jewelry via the API and simultaneously determines the group of users who should also be made aware of this loss prevention alert. Depending on the enterprise policy, the alert may interrupt conversations, break through engagement silence or be passed to other observation platforms responsible for loss prevention across the whole chain of operations.

3. Information Pulled from Users by External Systems:

Time Card Systems

Connections between external time-clock systems and the observation platform allow cross verification that an employee is, in fact, at work and moving about the enterprise. If there is mismatch such as an employee clocked-in, but not identified by the observation platform or if the employee is not clocked-in and is identified by the observation platform, the time clock system can issue a command to the observation platform to poll the user in question or their manager for verification.

For example, as users are identified by the observation platform, a message is sent via the API of each identified user. If a user is identified within the observation platform, but not "clocked in" to the time card system, the time card system can send a request for verification to the user via the API. The observation platform will then translate the API message to an audible format and direct the message to the correct user. The user will receive a request for verification and must respond with an acknowledgement or other id information per the enterprise policy administered by the observation platform.

In another example, a user may authorized by her manager for only 40 hours of work this week. As the time clock system determines the user is nearing his weekly time limit, the time clock may issue an instruction to user to verify that they are aware of the limited time remaining. The observation platform may use context, policy and inference to determine who hears the message and when they hear it. In one scenario, the message may play to the user when they are not engaged with a shopper or when they enter the break room. Additionally, the observation platform can use policy to determine if the manager on duty also hears the message.

External Alarm/Alert

An external alarm/alert may require an acknowledgement that a user has cleared the situation or responded to the alarm/alert request. For example, a refrigeration unit may send an alarm via the API that temperatures are not within specifications. The observation platform receives the alarm and uses context, policy and inference to notify the user or plurality of users that the alarm needs attention. The observation platform converts the alarm indication to an audible message and distributes that message to an appropriate set of users. Such appropriate users may include users who are near the refrigeration unit, users whose motions and locations indicate they are maintenance personnel, users who have identified themselves as maintenance personnel, and managers or supervisors who must assure action is taken quickly. The responding user can verbally indicate to the observation platform that they are working the problem so that no other user needs to respond. Once the problem is resolved, the user can clear the alarm in the usual manner with the refrigeration unit or, optionally, can use a verbal command to clear the alarm which is processed by the observation platform and passed via the API to the refrigeration unit to clear the alarm.

Mandatory Response

For mandatory response/acknowledgment of policy, legal or other critical matters, the issuing system may request a verbal verification that the user heard and understood the information.

Point of Sale (POS)

A POS system can recognize an unusual sale (product or quantity) and notify the observation platform via the API that it requests to know who assisted in the sale. The observation platform would then use text-to-speech generation, store policies, user context and inference rules to send an audible question to the most likely employees who may have helped that customer. For example, the sale of top-of-the-line kitchen appliances with many accessories would trigger an announcement such as, "Please identify yourself if you helped with selling the following kitchen appliances . . . " The observation platform might send this message to select group comprising users who have been near the kitchen appliances within the last 30 minutes, users identified as kitchen appliance experts, and users who were "engaged" near kitchen appliances in the last hour. The message may also immediately go to a manager or group of managers on duty and stored for other managers to hear as they connected to observation platform upon docking in for duty.

4. Information Pulled from External Devices by Users of the System:

Inventory Status or Availability

Users can ask the system a command such as, "SKU Lookup" and system will then let them speak a SKU number to check inventory. The system translates the verbal request into an API call for the external inventory management system to respond. When the external system responds, the observation platform directs the information to the requestor and may use inference to include other users who need to know if inventory is low. In one embodiment, the observation platform may follow the request with additional questions such as "did this result in a lost sale?" or "did you offer an alternative for this product?" In one embodiment, the external system may respond with alternate or nearby locations for the given SKU or product set and the user can inform the shopper of the choices.

Sales Goal, Visitor Count and Conversion Rate Information

Users can ask the system a command such as, "Sales Goal?" and the system will query an external device for the current sales goal information, convert the response to an audible message and play the message to the requesting user. The observation platform may also use context, policy and inference to notify others, such as managers, of the request and optionally of the response. In one embodiment, the user may request information regarding the number of visitors who have entered the building or other information such as the current conversion rate. There are many possibilities for the users to request information from external systems and devices using this same set of request/response processes.

Identity of Shoppers or Visitors as Determined by Third-Party Identity or Loyalty Systems Users can ask the system a command such as, "Who is in the store?" or "Who is in the hardware department" or "Who is near me?" and the observation platform will communicate with the external system via the API to determine if the store systems are able to identify shoppers and their locations. The store systems may use a variety of methods to determine the shoppers or visitors who are in the store or enterprise. The methods of identifying who is in the store or building are irrelevant to the observation platform as the queries are sent via the API to instruct the external device to report the relevant information. The observation platform then may convert the external device response to an audible message and use context, policy and inference to route the message to the requester and any of most appropriate users.

Product or Process Training Information

Users can ask the system a command such as, "Information for SKU number . . . " or "Return policy information" and the observation platform will communicate with the external system via the API to retrieve the information requested. The observation platform then may convert the external device response to an audible message and use context, policy and inference to route the message to the requester and any of most appropriate users.

Buy on-Line and Fulfill in Store

For example, a company's website may have a customer wanting a blue lampshade for a buy-on-line-fulfill-in-store transaction. The inventory database indicates that the blue lampshades are below the safety stock level cut-off with only one in stock in the store. The website can then push a message through the API to the observation platform requesting manual verification that the product is on the shelf. The inference engine in the observation platform may then route that request to employees who are located near the product, are not engaged with a shopper and who (optionally) have the correct role type assigned by the store. The employee can then push a message back to the website that they are responding to the request. If the website has not had confirmation within a set timeframe, it can begin to pull status information from the in-store employee until resolution is assured.

These are but a few examples of using the observation platform connected to external devices. The information flows can be used independently or combined for a complete set of productive or time-critical actions.

Figure 3:
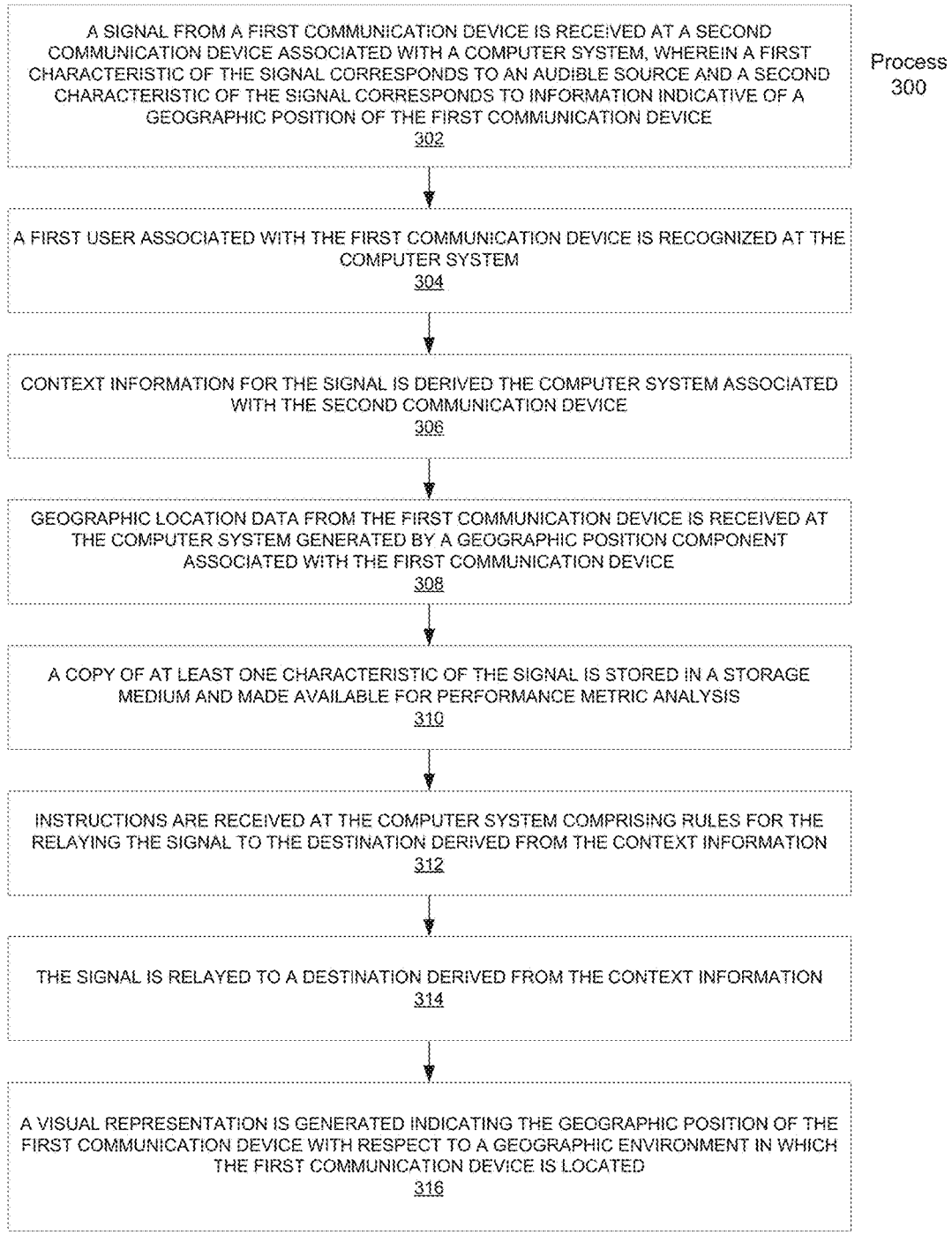
FIG. 3 illustrates a flowchart of an example method for structuring communication in an observation platform in accordance with embodiments of the present technology.

Operations of Using Structured Communications in an Observation Platform and Using Structured Communications with External Devices and Systems FIG. 3 is a flowchart illustrating process 300 for using structured communication in an observation platform in accordance with one embodiment of the present technology. Process 300 may also be described as disciplining communications in an observation platform. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 300 is performed by the components of FIG. 1A, 1B, 1C, 2, 8, 9, or 10. In one embodiment, the methods may reside in a computer usable storage medium having instructions embodied therein that when executed cause a computer system to perform the method.

At 302, a signal from a first communication device is received at a second communication device associated with a computer system, wherein a first characteristic of the signal corresponds to an audible source and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 304, a first user associated with the first communication device is recognized at the computer system.

At 306, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is a command for the computer system to perform. In one embodiment, the signal is encrypted or encoded uniquely with respect to the first communication device. The context information may be a command to the computer system. For example the computer system may be instructed to access a database in response to a query or may be given information to store for future reference.

In one embodiment, the information is a command and the command may be issued verbally by a user in a communication. For example, a user may speak into a communication device the phrase "hello everybody" thus the communication is the spoken phrase and the computer system may derive that the communication is to be sent to everybody. The computer system then relays the signal to everybody associated with the communication observation platform or to selected group of individuals based on enterprise policy and user context. In another example, the communication may be the phrase "hello Bob." The computer system derives that the destination of the communication is Bob; the communication is then relayed only to Bob within the guidelines of policy and context for contacting Bob.

The Table below shows examples of Communication Phrases and Derived Context information. Specific examples using sample vocabulary are given as well as more general cases indicated by the brackets [ ].

| Communication Phrase | Derived Context Information |
| --- | --- |
| "Hello Everybody"<br>Hello [Group] | The communication is to be relayed to a group defined as "everybody" and anyone may respond. Context information such as "engaged" may limit those who hear and may respond to the |

-continued

| Communication Phrase | Derived Context Information |
| --- | --- |
| | "Hello" phrase. Additional context information may limit those who hear the message to anyone who is not in the break room. |
| "Hello Bob"<br>Hello [Person] | The communication is to be relayed to an individual identified as "Bob" and only "Bob" hears the message and is able to respond. Context information such as "engaged" may result in the computer providing additional information to the caller such as the state of the user (e.g., "engaged") and other factors such as location or delaying the message until the contextual status and enterprise policy indicate message delivery. |
| "Hello Workshop"<br>Hello [Location] | The communication is to be relayed to everyone associated with the "Workshop" location or a subset of those near the workshop depending on policy. Context information such as "engaged" may limit those who hear and may respond to the "Hello" phrase. |
| "Hello Process Experts"<br>Hello [Group] | The communication is relayed to all identified as the group, "Process Experts." These people or external devices may be physically located in any region or environment. Context information such as "engaged" may limit those who hear and may respond to the "Hello" phrase. |
| "Urgent Bob" or "Interrupt Bob"<br>Interrupt [Person]<br>Interrupt [Group]<br>Interrupt [Location] | The communication is an urgent communication to be relayed to "Bob." Such a command may interrupt "Bob" if he is "engaged" or communicating with others or the system as defined by the operator of the environment. Once interrupted, communication is between the caller and original user (i.e., Bob) and may or may not include others who may have been talking with Bob at the time. |
| "Message Bob"<br>Message [Person]<br>Message [Group]<br>Message [Location] | Leaves a message that persists for a pre-determined interval. Messages for groups are heard as persons become available. Messages for locations are heard as persons become available or enter the location area. Special cases for 'messages" include delivering audio information to groups such as Marketing Departments, Buyers, Help Desks, Websites, Technical Support or Product improvement requests. |
| "Announcement Everybody"<br>Announcement [Group] | The communication is to be relayed to "everyone" as a bulletin. Those users who are engaged or not yet on the system will hear the bulletin when they become available. Policy is used to determine how long the announcement waits for a user to be identified or become available on the system. |
| "Selling tip for the side hallway"<br>Announcement [Location] | The communication is to be relayed to those who are within or enter the side hallway as an announcement. Context is used to determine if the user actions and history are consistent with policy for playing the announcement. No response is anticipated. |
| "Mandatory Response for Maintenance Team"<br>Absolute Announcement [Group] or [Location] or [Person] | The communication is delivered to all who are available and in the proper context according to policy. A response from each user or subset of users is mandatory. The system records the time, location, user and spoken response for later analysis or storage. The data regarding the message and the mandatory response may be passed via the API to an external system for record keeping or follow-up actions. |
| "Where is Steve"<br>Where is [Person]<br>Where is [Group] | The communication is a command to determine a geographic location of Steve and to send a message back to the communication device from the computer system that speaks the response. The response may also include contextual information such as "Steve is available" or "Steve is engaged" or other information from other sources such as "Steve is on break." Steve does not need to hear that his status was being |

| Communication Phrase | Derived Context Information |
| --- | --- |
| | probed, although it is possible to alert him. External systems can use the API to poll locations of users depending on enterprise policy. |
| "Who is near the central hallway?" Who is near [Location] | The communication is a command to determine who is geographically located near the central hallway region and to send a message back to the communication device from the computer system that speaks the response. The response may include additional contextual information for the persons in that location. External systems can use the API to poll locations of users depending on enterprise policy. |
| "Go to simple menu" Command [profile] | The communication is a command for the computer system to go to the simple menu profile and to send a message back that speaks the phrase "you will now go to simple menu." This feature allows individual users to move into different command, control and skill level profiles within the system. External systems such as website and control portal can use the API to directly control the user's command & control profile within the observation platform |
| "Does anyone know if we have . . . ?" Spoken String | Some formats of commands are natural to the users, but are not a structured speech pattern. In this case, the words, "Does anyone know . . . " may trigger the observation platform to send this message to group of users who know where things are. Contextual information may limit that group to a department or location. Additionally, the question may trigger a translation from speech to machine readable format, passed through the API and delivered to external system for a machine response. |
| "I have a question for . . . " Spoken String | If a user is asking a question, the observation platform uses context, policy and inference to get the best answer in the least possible time. The words, "I have a question for" may trigger the system to send the verbal request for information to specialist groups with the observation platform or in other observation platform in different locations. Additionally, the system may use the API, to request a response from an external expert system or knowledgebase. The instruction passed by the API may be either the spoken question or a conversion of speech to text or other machine understandable language. |
| "Shoppers dwelling near . . . " Informational Message from External Device Not Requiring a Response | This is a sample of one of many possibilities of an external device informing a user or plurality of users about an actionable event or situation. The observation platform uses context, policy and inference to determine the most appropriate user(s) to hear the message. Users hear the message based on their location, activity, and other contextual information. |
| "Customer assistance needed near . . . " Request Message from External Device Encouraging a Response | This is an example of one of many possibilities of an external device requesting a response or actions from a user. In this case, the machine issues an announcement that a response from one or more users would be helpful. The response may be a verbal command or spoken sequence of words that indicate the user is taking responsibility for correcting the problem or initiating actions. The observation platform may play repetitive messages or sounds, or use context and policy to determine the system behavior until a response is determined for the message. |
| "Refrigeration unit is too warm" Mandatory Response Message from External Device Requiring a Response | This is an example of one of many possibilities of an external device requiring a mandatory response from a user. In this case, the machine issues an alarm that requires a mandatory response from one or more users. The response may be a verbal command or spoken sequence of words that indicate the user is taking responsibility for correcting the problem or initiating actions. The observation platform may |

| Communication Phrase | Derived Context Information |
| --- | --- |
| | restrict user options, play repetitive messages or sounds, or use context and policy to determine the system behavior until a response is determined for the mandatory message. The system may store all information associated with the mandatory response for accounting or legal reasons. |

The phrase "Go to simple menu" may be a command to enter a different menu structure for such activities as new-user learning, learning about products or business, listening to communications, or set-up functions such as group participation and default settings for the individual.

At 308, a geographic location of the first communication device is determined based on the second characteristic of the signal and at least one other source of information. For example, the at least one other source of information may be a router that the signal is routed through, a signal strength of the signal or surrounding signals, information from the second communication device, etc.

At 310, a copy of at least one characteristic of the signal is stored in a storage medium and is made available for performance metric analysis. In one embodiment, the performance metrics are key performance indicators (KPIs). At least one characteristic may be, but is not limited to, a time stamp, engaged, available status, a message, a voice file, a location, a signal signature, a type of message, text corresponding to a message, commands used to initiate the message, other contextual information about the user and an identity of the path the signal was routed through.

At 312, instructions are received at the computer system comprising rules for the relaying the signal to the destination derived from the context information. The rules may instruct to whom and to how the communication is to be relayed as determined by the enterprise policy. For example, information derived from a communication may command that the communication be sent to everyone associated with the geographic location of "Workshop." However, the rules may instruct that the communication is only relayed to those associated within the "Workshop" who are designated as available or not busy. The rules may also comprise a predetermined time or a lifetime in which a response may be relayed to an available communication device.

At 314, the signal is relayed to a destination derived from the context information. The destination may be another user or a plurality of users, or external devices, or the computer system itself. The destination may be located outside of a radio range associated with the second communication device or be otherwise physically remote relative to the second communication device.

At 316, a data entry and visual representation is generated indicating the geographic position of the first communication device with respect to a geographic environment in which the first communication device is located. For example, the visual representation may be a map depicting the location of users or where users have been. The data entry and visual representation may include a status indicator of the user such as whether the user is busy or available.

FIG. 4 is a flowchart illustrating process 400 for using a structured communication in an observation platform in accordance with one embodiment of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 400 is performed by the components of FIG. 1A, 1B, 1C, 2, 8, 9, or 10. In one embodiment, the methods may reside in a computer usable storage medium having instructions embodied therein that when executed cause a computer system to perform the method.

At 402, a signal from a first communication device is received at a second communication device, wherein a first characteristic of the signal corresponds to a voice of a first user and a second characteristic of the signal corresponds to information indicative of a geographic position of the first communication device. Additional characteristics of the signal may include contextual information and environmental information. For example, the audible source may be the voice of a user, the signal characteristics may include signal signature information and contextual/environmental information may include user status (e.g., engaged or on-break) and/or background noise levels.

At 404, the first user associated with the first communication device is recognized.

At 406, text or machine code related to the voice of the first user is recognized.

At 408, context information from the text or machine code is derived at a computer system associated with the second communication device, wherein the context information corresponds to a command related to the text or machine code.

At 410, the text or machine code is stored in a storage medium for developing performance metrics.

At 412, the signal is relayed to a destination derived from the context information. The destination may be located outside of a radio range associated with the second communication device or be otherwise physically remote relative to the second communication device. The destination may be an external system whereby the information is passed through the API and instructs the remote system accordingly.

Figure 5:
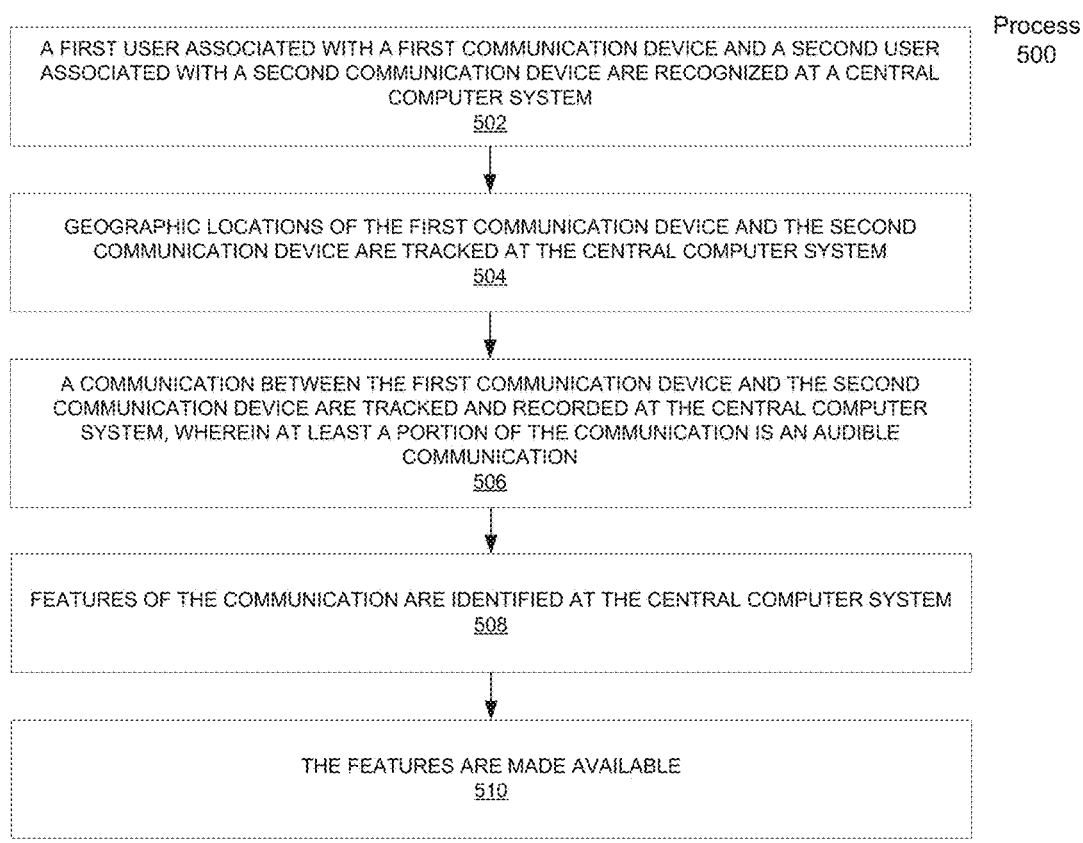
FIG. 5 illustrates a flowchart of an example method for observing and recording users of communication devices in accordance with embodiments of the present technology.

FIG. 5 is a flowchart illustrating process 500 for observing and recording users of communication devices in accordance with one embodiment of the present technology. In one embodiment, process 500 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 500 is performed by the components of FIG. 1A, 1B, 1C, 2, 8, 9, or 10. In one embodiment, the methods may reside in a computer usable storage medium having instructions embodied therein that when executed cause a computer system to perform the method.

In one embodiment, process 500 is a management observation tool for keeping track of mobile human resources and collecting data on their activities.

At 502, a first user associated with a first communication device and a second user associated with a second communication device are recognized at a central computer system.

At 504, geographic locations of the first communication device and the second communication device are tracked at the central computer system. In one embodiment, tracking means storing data about location and any spoken information.

At 506, a communication between the first communication device and the second communication device are tracked and recorded at the central computer system, wherein at least a portion of the communication is an audible communication.

At 508, features of the communication are identified at the central computer system. Features may be described as characteristics or data regarding the communication itself. The features may be user status such as engaged/available, location of a user, communication history of the user, context of the communication, keywords used in the communication, a classification of the communication, and time stamps.

At 510, the features of the communication are made available to a manager, operations staff or operations machines for making decisions or informing the users that new actions are requested.

Figure 6:
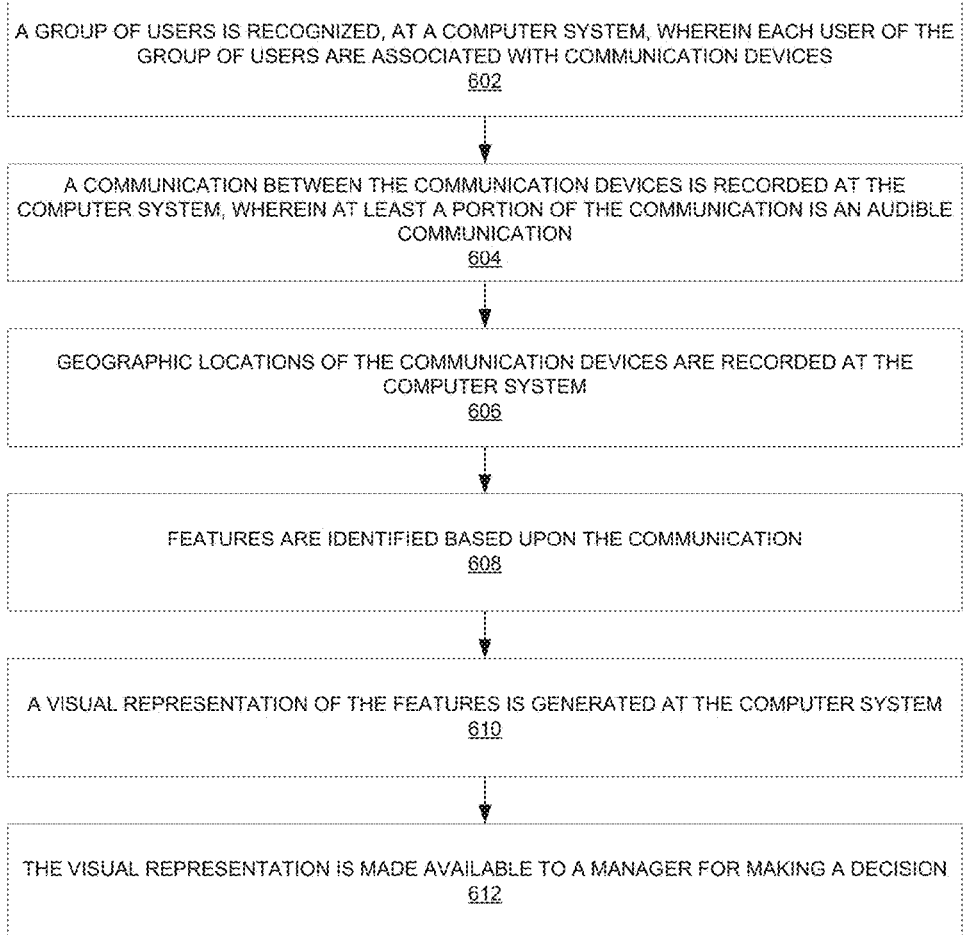
FIG. 6 illustrates a flowchart of an example method for characterizing communications in a group of users in accordance with embodiments of the present technology.

FIG. 6 is a flowchart illustrating process 600 for characterizing communications in a group of users in accordance with one embodiment of the present technology. In one embodiment, process 600 is a computer implemented method that is carried out by processors and electrical components under the control of computer usable and computer executable instructions. The computer usable and computer executable instructions reside, for example, in data storage features such as computer usable volatile and nonvolatile memory. However, the computer usable and computer executable instructions may reside in any type of non-transitory computer usable storage medium. In one embodiment, process 600 is performed by the components of FIG. 1A, 1B, 1C, 2, 8, 9, or 10. In one embodiment, the methods may reside in a computer usable storage medium having instructions embodied therein that when executed cause a computer system to perform the method.

At 602, a group of users is recognized, at a computer system, wherein each user of the group of users are associated with communication devices. The group of users may be recognized based on a classification of the user or a geographic location of the users. For example, a classification of the users may be whether the user is an associate or a customer in a retail setting. Similarly, the group of user may include external devices accessed via the API.

At 604, a communication between the communication devices is recorded at the computer system, wherein at least a portion of the communication is an audible communication. In one embodiment, at least a portion of the communication is a pre-recorded audible communication.

At 606, geographic locations of the communication devices are recorded at the computer system. The location may be determined based on signal signatures or other "clues" from other devices sent periodically or with the communication indicative of the location.

At 608, features are identified based upon the communication. Features may be described as characteristic or data regarding the communication itself. The features may be a user status such as engaged/available, location of a user, communication history of the user, context of the communication, a classification of the communication, a frequency of communications between two users, a length of a communication, keywords used in the communication, a response time to a communication and time stamps.

At 610, a visual representation of the features is generated at the computer system. The visual representation may depict when a user of said group of users is engaged in said communication, when a user of said group of users asks a question in said communication, who responds to the question, where each user of said group of users are located, and where said group of users are not located. Alerts, either visual or verbal, may be generated depending on the rules established by the system operators.

At 612, the visual representation is made available to a manager, operations staff or external systems for making decisions or informing the users that new actions are requested.

FIG. 7 is a flowchart illustrating process 700 for using structured communication in a plurality of observation platforms in accordance with one embodiment of the present technology. Process 700 may also be described as disciplining communications in an observation platform. In one embodiment, process 700 is a computer implemented method that is carried out by processors and electrical components under the control of computer usable and computer executable instructions. The computer usable and computer executable instructions reside, for example, in data storage features such as computer usable volatile and nonvolatile memory. However, the computer usable and computer executable instructions may reside in any type of non-transitory computer usable storage medium. In one embodiment, process 700 is performed by the components of FIG. 1A, 1B, 1C, 2, 8, 9, or 10. In one embodiment, the methods may reside in a computer usable storage medium having instructions embodied therein that when executed cause a computer system to perform the method.

At 702, a signal in a first observation platform is received from a first communication device at a second communication device associated with a computer system wherein a first characteristic of the signal corresponds to an audible source and a second characteristic of the signal corresponds to information indicative of a geographic position of the first communication device, and wherein the second observation platform is associated with a radio range. Additional characteristics of the signal may include contextual information and environmental information. For example, the audible source may be the voice of a user or of an external system that converts machine language to an audible message, the signal characteristics may include signal signature information and contextual/environmental information may include user status (e.g., engaged or on-break) and/or background noise levels.

At 704, a first user associated with the first communication device is recognized at the computer system.

At 706, context information for the signal is derived at the computer system associated with the second communication device. The context information may be geographic information, data regarding length or time of communication, or text of the communication. In one embodiment, speech to text recognition techniques are employed to covert an audible communication to text. In one embodiment, the context information is an instruction for the computer system to perform. In one embodiment, the signal is encrypted or encoded uniquely with respect to the first communication device. The context information may be a command directed to the computer system. For example the computer system may be commanded to access a database in response to a query.

At 708, the signal is relayed from the computer system to a second computer system associated with a second observation platform via a computer network.

At 710, the signal is relayed to a destination in the second observation platform via the second computer system derived from said context information.

FIG. 11 is a flowchart illustrating process 1100 for using an observation platform with an external device in accordance with one embodiment of the present technology. In one embodiment, process 1100 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 1100 is performed by the components of FIG. 1A, 1B, 1C, 2, 8, 9, or 10. In one embodiment, the methods may reside in a computer usable storage medium having instructions embodied therein that when executed cause a computer system to perform the method.

At 1102, a signal is received from a first communication device at a second communication device associated with a computer system wherein a first characteristic of the signal corresponds to an audible source and a second characteristic of the signal corresponds to information indicative of a geographic position of the first communication device. In one embodiment, the first communication device comprises a user interface with only one button for receiving a communication from a user and for sending the communication as the signal, wherein the only one button is a virtual button or a physical button.

At 1104, context information is derived from the signal at the computer system from, at least in part, a speech to text analysis of the audible source, a policy implemented in the computer system by a controlling enterprise, and inferences calculated by a combination of text analysis, and secondary information contained in the signal. In one embodiment, the context information is pulled from the first communication device.

At 1106, an action is determined to take place at an external device based on the context information, wherein the external device is one of a plurality of external devices and is networked to the second communication device. In one embodiment, the context information is used to identify which of the plurality of external devices the action is to place at. It should be appreciated that the external device may be external device 902 of FIG. 9 with any or all of the features and capabilities for external devices described herein.

At 1108, a second signal is sent to the external device to instruct the device to take the action. In one embodiment, the action is executed by the external device. In one embodiment, the second signal is sent to a plurality of external devices. In one embodiment, the external device is owned and/or operated by a third party.

Figure 12:
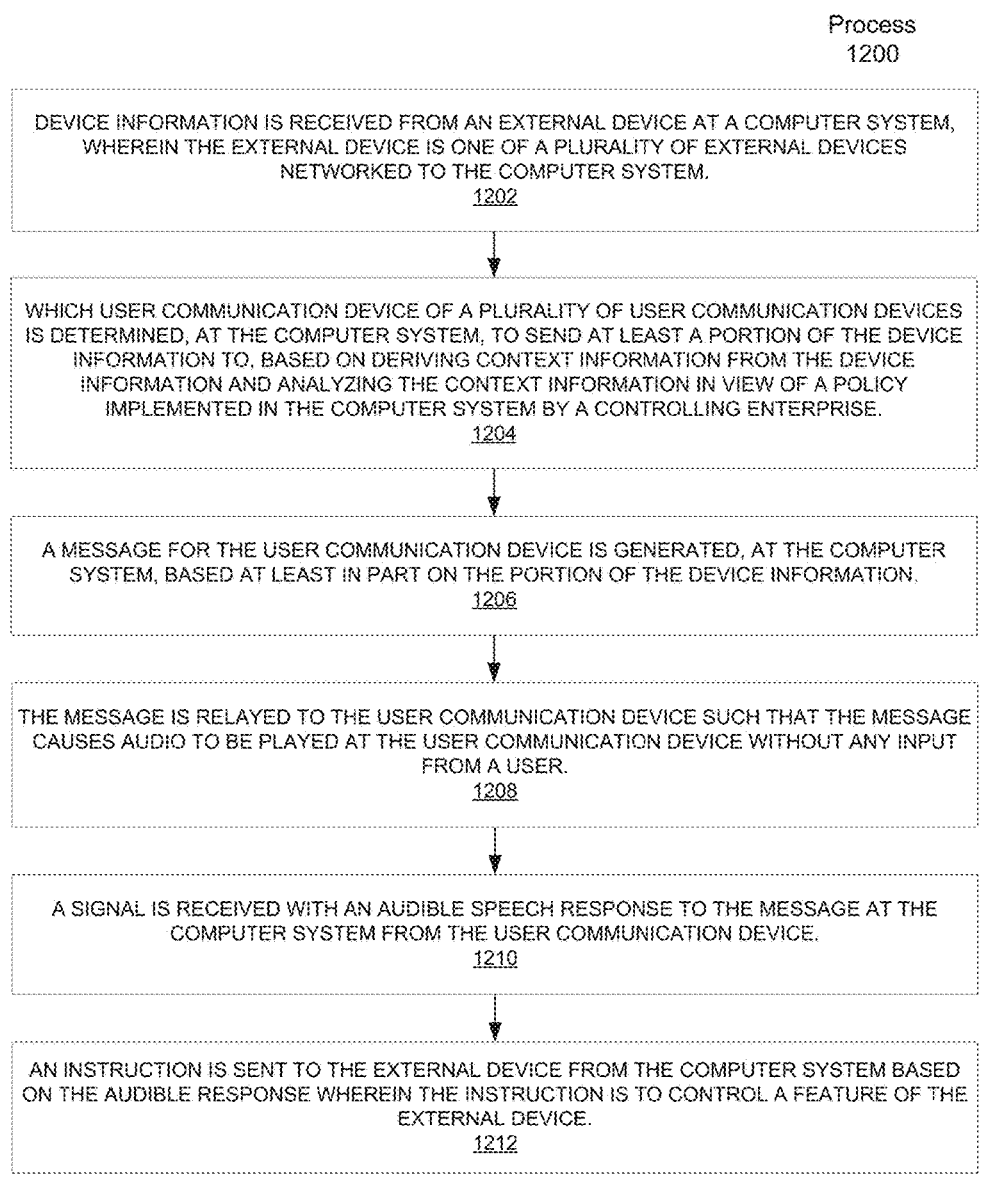
FIG. 12 illustrates a flowchart of an example method for observation platforms using structured communications with external devices and systems in accordance with embodiments of the present technology.

FIG. 12 is a flowchart illustrating process 1200 for using an observation platform with an external device in accordance with one embodiment of the present technology. In one embodiment, process 1200 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of non-transitory computer usable storage medium. In one embodiment, process 1200 is performed by the components of FIG. 1A, 1B, 1C, 2, 8, 9, or 10. In one embodiment, the methods may reside in a computer usable storage medium having instructions embodied therein that when executed cause a computer system to perform the method.

At 1202, device information is received from an external device at a computer system, wherein the external device is one of a plurality of external devices networked to the computer system. It should be appreciated that the external device may be external device 902 of FIG. 9 with any or all of the features and capabilities for external devices described herein.

At 1204, which user communication device of a plurality of user communication devices is determined, at the computer system, to send at least a portion of the device information to, based on deriving context information from the device information and analyzing the context information in view of a policy implemented in the computer system by a controlling enterprise. In one embodiment, the determining selects the user communication device or subset of user communication devices from among the plurality of user communication devices because the user communication device is geographically the closest to the external device or to the action indicated by the external device. In one embodiment, the determining selects the user communication device from among the plurality of user communication devices based on engaged status, available status, role, current location and/or past movement history.

At 1206, a message for the user communication device is generated, at the computer system, based at least in part on the portion of the device information.

At 1208, the message is relayed to the user communication device such that the message causes audio to be played at the user communication device without any input from a user. In one embodiment, the message requires a mandatory response from a user associated with the user communication device. In one embodiment, the message prompts the user for and action and acknowledgement. In one embodiment, the message is sent to a plurality of user communication devices. In one embodiment, the message is an alert to the user that customer service is needed for a specific location or requiring a specific set of skills or talents At 1210, a signal is received with an audible speech response to the message at the computer system from the user communication device.

At 1212, an instruction is sent to the external device from the computer system based on the audible response wherein the instruction is to control a feature of the external device. In one embodiment, the instruction is sent to a plurality of external devices.

Example Computer System Environment

Portions of the present technology are composed of computer-readable and computer-executable instructions that reside, for example, in computer-usable media of a computer system or other user device. Described below is an example computer system or components that may be used for or in conjunction with aspects of the present technology.

It is appreciated that that the present technology can operate on or within a number of different computer systems including general purpose networked computer systems, embedded computer systems, cloud-based computers, routers, switches, server devices, user devices, various intermediate devices/artifacts, standalone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g., via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for using an observation platform with an external device, comprising:
   receiving a signal from a first communication device at a second communication device associated with a computer system wherein a first characteristic of said signal corresponds to an audible source proximate to said first communication device and a second characteristic of said signal corresponds to information indicative of a geographic position of said first communication device;
   deriving context information from said signal at said computer system from, at least in part, a speech to text analysis of said audible source, a policy implemented in said computer system by a controlling enterprise, and inferences calculated by a combination of policy, text analysis, and secondary information contained in said signal;
   determining an action to take place at an external device based on said context information, wherein said external device is one of a plurality of external devices and is networked to said second communication device; and
   sending a second signal to said external device to instruct said device to take said action.

2. The method as recited in claim 1 wherein said action is executed by said external device.

3. The method as recited in claim 1 wherein said context and policy information is used to identify which of said plurality of external devices said action is to place at.

4. The method as recited in claim 1 wherein said first communication device comprises a user interface with only one button for sending said communication as said signal, wherein said only one button is a virtual button or a physical button.

5. The method as recited in claim 1 wherein said first communication device is an application that communicates through the Internet that an action is required by one or more users within the observation platform.

6. The method as recited in claim 1 wherein said first communication device is an external device that uses said context and policy to issue instructions to one or a plurality of said external device(s).

7. The method as recited in claim 1 wherein said context information is pulled from said computer system by the external device.

8. The method as recited in claim 6 wherein said computer system pulls information from said first communication device or a user of said first communication device.

9. The method as recited in claim 1 wherein said sending said second signal is sent to more than one of said plurality of external devices.

10. The method as recited in claim 1 wherein said external device is operated by a third party.

11. The method as recited in claim 1 wherein said external device employs communication through the internet via a uniform resource locator (URL) and standard internet protocols.

12. The method as recited in claim 1 wherein said external device employs communications methods selected from the group of communications methods consisting of: Bluetooth, low-energy Bluetooth (BLE), ZigBee, radio wave, cell phone signals, and WiFi comprising all standard 802.x devices.

13. A non-transitory computer-usable storage medium having instructions embodied therein that when executed cause a computer system to perform a method for using an observation platform with an external device, said method comprising:
   receiving a signal from a first communication device at a second communication device associated with a computer system wherein a first characteristic of said signal corresponds to an audible source proximate to said first communication device and a second characteristic of said signal corresponds to information indicative of a geographic position of said first communication device;
   deriving context information from said signal at said computer system from, at least in part, a speech to text analysis of said audible source, a policy implemented in said computer system by a controlling enterprise, and inferences calculated by a combination of text analysis, and secondary information contained in said signal;
determining an action to take place at an external device based on said context information, wherein said external device is one of a plurality of external devices and is networked to said second communication device; and
sending a second signal to said external device to instruct said device to take said action.

14. A method for using an observation platform with an external device, comprising:
receiving external device information from an external device at a computer system, wherein said external device is one of a plurality of external devices networked to said computer system;
determining, at said computer system, which user communication device of a plurality of user communication devices to send at least a portion of said external device information to, based on deriving context information from said external device information and analyzing said context information in view of a policy implemented in said computer system by a controlling enterprise;
generating, at said computer system, a message for said user communication device based at least in part on said portion of said external device information; and
relaying said message to said user communication device such that said message causes audio to be played at said user communication device.

15. The method as recited in claim 14, further comprising:
receiving a signal with an audible speech response to said message at said computer system from said user communication device.

16. The method as recited in claim 15, further comprising:
sending an instruction to said external device from said computer system based on said audible response wherein said instruction is to control a feature of said external device.

17. The method as recited in claim 16 wherein said instruction is sent to a plurality of external devices.

18. The method as recited in claim 14, further comprising:
converting a machine generated signal from said external device into an audible message played to a selected user or users as determined by context and policy.

19. The method as recited in claim 14 wherein said message is informational, requiring no response; is a request for action, encouraging a response; or mandatory, requiring a response from a user.

20. The method as recited in claim 14 wherein said message is sent to a plurality of user communication devices.

21. The method as recited in claim 14 wherein said message is an alert to said user that attention is needed at a specific geographic location or with a specific talent set as determined by user context.

22. The method as recited in claim 14 wherein said determining selects said user communication device from among said plurality of user communication devices because said user communication device is geographically the closest to said external device.

23. The method as recited in claim 14 wherein said determining selects said user communication device from among said plurality of user communication devices based on engaged status, available status, role, current location and/or past movement history.

24. The method as recited in claim 14 wherein said external device is a button located in a kiosk that a customer presses when in need of assistance.

25. The method as recited in claim 14 wherein said external device is an image capturing device and said context information derives data from image processing techniques regarding movements of people in images or video.

26. The method as recited in claim 14 wherein said external device is operated by a third party.

27. The method as recited in claim 14 wherein said external device employs communications methods selected from the group of communications methods consisting of: Bluetooth, Bluetooth Low Energy (BLE), ZigBee, radio wave, cell phone signals, and WiFi comprising all 802.x standards.

28. The method as recited in claim 14 wherein said external device employs communication through the internet via a uniform resource locator (URL) and standard internet protocols.

29. The method as recited in claim 14 wherein said external device comprises a proximity detection sensor.

30. The method as recited in claim 14 wherein said external device comprises a proximity detection system comprising a stationary beacon that causes a mobile device to contact said external device when said mobile device is within proximity of said external device wherein said mobile device is associated with a user.

31. The method as recited in claim 14 wherein said external device comprises a proximity detection system such that when a beacon in said user communication device is in proximity to a mobile device, said mobile device is trigged to contact said external device.

32. The method of claim 31 wherein said external device sends a message to said user communication device regarding an identity of a user associated with said mobile device and additional information as determined by said external device.

33. The method as recited in claim 14 wherein said external device information is a failure alarm.

34. The method as recited in claim 14 wherein said external device information is an audible alert requiring an acknowledgment to pull a product from a shelf based on a purchase made online that is to be picked up in store.

35. A non-transitory computer-usable storage medium having instructions embodied therein that when executed cause a computer system to perform a method for using an observation platform with an external device, said method comprising:
receiving external device information from an external device at a computer system, wherein said external device is one of a plurality of external devices networked to said computer system;
determining, at said computer system, which user communication device of a plurality of user communication devices to send at least a portion of said external device information to, based on deriving context information from said external device information and analyzing said context information in view of a policy implemented in said computer system by a controlling enterprise;
generating, at said computer system, a message for said user communication device based at least in part on said portion of said external device information; and relaying said message to said user communication device such that said message causes audio to be played at said user communication device.

\* \* \* \* \*